United States Patent
Ranatunga et al.

(10) Patent No.: US 11,582,086 B2
(45) Date of Patent: Feb. 14, 2023

(54) NETWORK MONITORING SYSTEM, NETWORK MONITORING METHOD, AND PROGRAM

(71) Applicant: Sony Corporation, Tokyo (JP)

(72) Inventors: Vijitha Sanjeewa Ranatunga, Tokyo (JP); Yoshinobu Kure, Tokyo (JP); Yoshihiro Kosaka, Tokyo (JP); Yuta Choki, Tokyo (JP); Chuan Yu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/260,743

(22) PCT Filed: Aug. 7, 2019

(86) PCT No.: PCT/JP2019/031139
§ 371 (c)(1),
(2) Date: Jan. 15, 2021

(87) PCT Pub. No.: WO2020/036110
PCT Pub. Date: Feb. 20, 2020

(65) Prior Publication Data
US 2021/0336841 A1    Oct. 28, 2021

(30) Foreign Application Priority Data
Aug. 15, 2018  (JP) .............................. JP2018-152942

(51) Int. Cl.
*H04L 41/0631*    (2022.01)
(52) U.S. Cl.
CPC ................................ *H04L 41/0631* (2013.01)

(58) Field of Classification Search
CPC ................................................... H04L 41/0631
See application file for complete search history.

(56) References Cited

U.S. PATENT DOCUMENTS 9,407,560 B2 *  8/2016  Crisan ................. H04L 47/2425
2012/0166629 A1  6/2012  Imamura
(Continued)

FOREIGN PATENT DOCUMENTS

| JP | 8-163125 A | 6/1996 |
| JP | 9-160849 A | 6/1997 |

(Continued)

OTHER PUBLICATIONS

Anonymous ED—Anonymous: "Passages; Integrated network management system NETM * Cm2; Version 5; Overview Common Manual", Oct. 10, 1998 (Oct. 10, 1998), Integrated Network Management System NETM * CM2; Version 5; Overview Common Manual, 1st Ed. Hitachi, Ltd., JP, pp. 3-5, 8, XP009525522,.

(Continued)

*Primary Examiner* — Philip C Lee
(74) *Attorney, Agent, or Firm* — Oblon, McClelland, Maier & Neustadt, L.L.P.

(57) ABSTRACT

In the present disclosure, a network monitoring system is provided including an IP network monitoring unit (610) that monitors an IP network to which an IP device is connected; and a non-IP device monitoring unit (630) that monitors a non-IP device. It is possible to monitor both the IP network and the non-IP device in a system that includes the IP network including the IP device and the non-IP device.

18 Claims, 23 Drawing Sheets

(56) References Cited

U.S. PATENT DOCUMENTS

| | | | | |
|---|---|---|---|---|
| 2013/0117847 | A1* | 5/2013 | Friedman | H04L 47/20 709/201 |
| 2015/0195126 | A1* | 7/2015 | Vasseur | G06N 20/00 370/218 |
| 2016/0080274 | A1* | 3/2016 | Meyer | H04L 45/52 370/231 |
| 2016/0119255 | A1* | 4/2016 | Luo | H04L 41/12 370/218 |
| 2016/0301779 | A1* | 10/2016 | Cui | H04L 45/566 |
| 2017/0026292 | A1* | 1/2017 | Smith | H04L 41/0663 |
| 2017/0195255 | A1* | 7/2017 | Pham | H04L 12/4633 |
| 2017/0251515 | A1* | 8/2017 | Altman | H04L 45/245 |
| 2018/0077119 | A1 | 3/2018 | Fields et al. | |
| 2018/0109440 | A1* | 4/2018 | Knee | H04L 45/22 |
| 2020/0169494 | A1* | 5/2020 | K | H04L 43/16 |

FOREIGN PATENT DOCUMENTS

| | | |
|---|---|---|
| JP | 2012-138727 A | 7/2012 |
| JP | 5306365 B2 | 10/2013 |
| JP | 2014-225775 A | 12/2014 |

OTHER PUBLICATIONS

"Integrated Network Management System NETM*Cm2 version 5" Outline of common manual, 1st edition, Hitachi, Ltd. Oct. 10, 1998, total pp. 59.

International Search Report dated Oct. 21, 2019 in PCT/JP2019/031139 filed on Aug. 7, 2019, 2 pages.

* cited by examiner

Fig. 5

| Flow List | | Bitrate(bps) | Bytes |
|---|---|---|---|
| AVStream_Multicast(IPC_TX1) | Show Flow | 8,560,557,792 | 53911911992 |
| Control_Broadcast(From IPC_RX1) | | 384 | 3006300 |
| Control_Broadcast(From IPC_RX2) | | 0 | 0 |
| Control_Broadcast(From IPC_TX1) | | 384 | 2655972 |
| Control_Broadcast(From IPC_TX2) | | 384 | 2652772 |
| Control_Broadcast(From USC) | | 512 | 4719787 |
| Control_Unicast(USC to IPC_RX1) | | 0 | 0 |
| Control_Unicast(USC to IPC_TX1) | | 0 | 388 |
| | | 0 | 43800 |

| PORT_ID | Rx Pkts | Tx Pkts | Rx Bytes | Tx Bytes | Rx Errs | Tx Errs | Collisions | Link_Down |
|---|---|---|---|---|---|---|---|---|
| SDN SWITCH:1:2 | 20380290431 | 4640333 | 20673548191829 | 69374898 | 54501 | 0 | 0 | false |
| SDN SWITCH:1:4 | 20668377172 | 639336 | 20761554725031 | 6872978 | 122213 | 0 | 0 | false |
| SDN SWITCH:1:6 | 235511 | 604588 | 2841253 | 65634339 | 0 | 0 | 0 | false |
| SDN SWITCH:1:8 | 104569 | 91577 | 24854051 | 8556882 | 0 | 0 | 0 | false |
| SDN SWITCH:1:10 | 212459 | 200168111875 | 21355388 | 20190104213050 | 0 | 0 | 0 | false |
| SDN SWITCH:1:12 | 54114 | 1338189557 | 6387383 | 160633086812 | 0 | 0 | 0 | false |
| SDN SWITCH:1:LOCAL | 7 | 114705 | 738 | 11011680 | 0 | 0 | 0 | false |

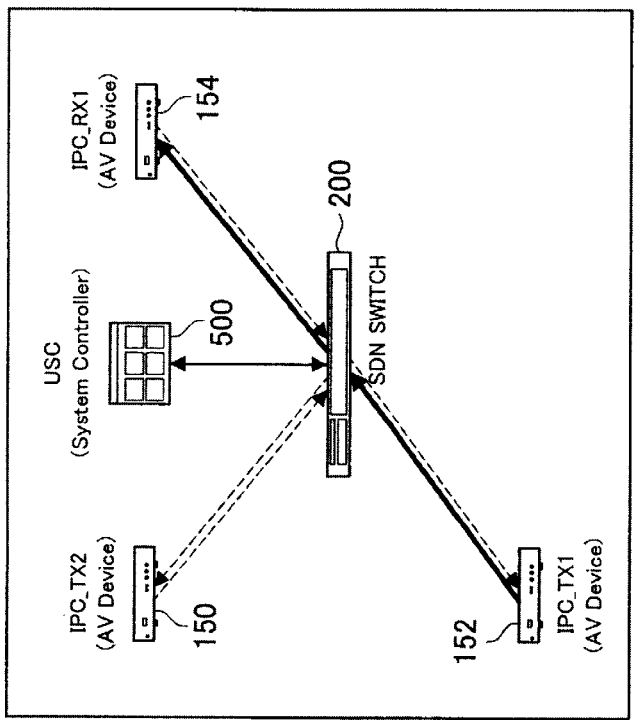

| Group List | Input Port | Output Port |
|---|---|---|
| AVStream_Multivcast(IPC_TX1) | input=2 | output=10,set_queue=2 |

NETWORK MONITORING SYSTEM, NETWORK MONITORING METHOD, AND PROGRAM

TECHNICAL FIELD

The present disclosure relates to a network monitoring system, a network monitoring method, and a program.

BACKGROUND ART

PTL 1 below discloses a conventional monitoring of a movable state using an IP network and Ethernet (registered trademark) OAM.

CITATION LIST

Patent Literature

PTL 1
JP 5306365 B

SUMMARY

Technical Problem

In constructing an IP network, it is expected that a non-IP device is connected to the IP network. It is difficult for the technique disclosed in PTL 1 to monitor both an IP network and a non-IP device in a state where the non-IP device is connected to the IP network including an IP device.

Therefore, there is a need to monitor both an IP network and a non-IP device in a system that includes the IP network including an IP device and the non-IP device.

Solution to Problem

In the present disclosure, a network monitoring system is provided including an IP network monitoring unit that monitors an IP network to which an IP device is connected; and a non-IP device monitoring unit that monitors a non-IP device.

Further, in the present disclosure, a network monitoring method is provided including monitoring an IP network to which an IP device is connected; and monitoring a non-IP device. Further, in the present disclosure, a network monitoring method for a transmission system in which audio-visual (AV) signals are converted into IP packets is provided including monitoring an IP network to which an IP device is connected; and monitoring a non-IP device.

Further, in the present disclosure, a program is provided for causing a computer to function as means for monitoring an IP network to which an IP device is connected; and means for monitoring a non-IP device.

Advantageous Effects of Invention

According to the present disclosure as described above, it is possible to monitor both the IP network and the non-IP device in a system that includes the IP network including the IP device and the non-IP device.

Note that the above effects are not necessarily limited, and together with or in place of the above effects, any of the effects described herein, or any other effect that can be understood herein may be provided.

BRIEF DESCRIPTION OF DRAWINGS

FIG. 5 is a schematic diagram illustrating display information in which a network topology is visualized, generated by a flow display control unit of an SDN controller.

DESCRIPTION OF EMBODIMENTS

Figure 1:
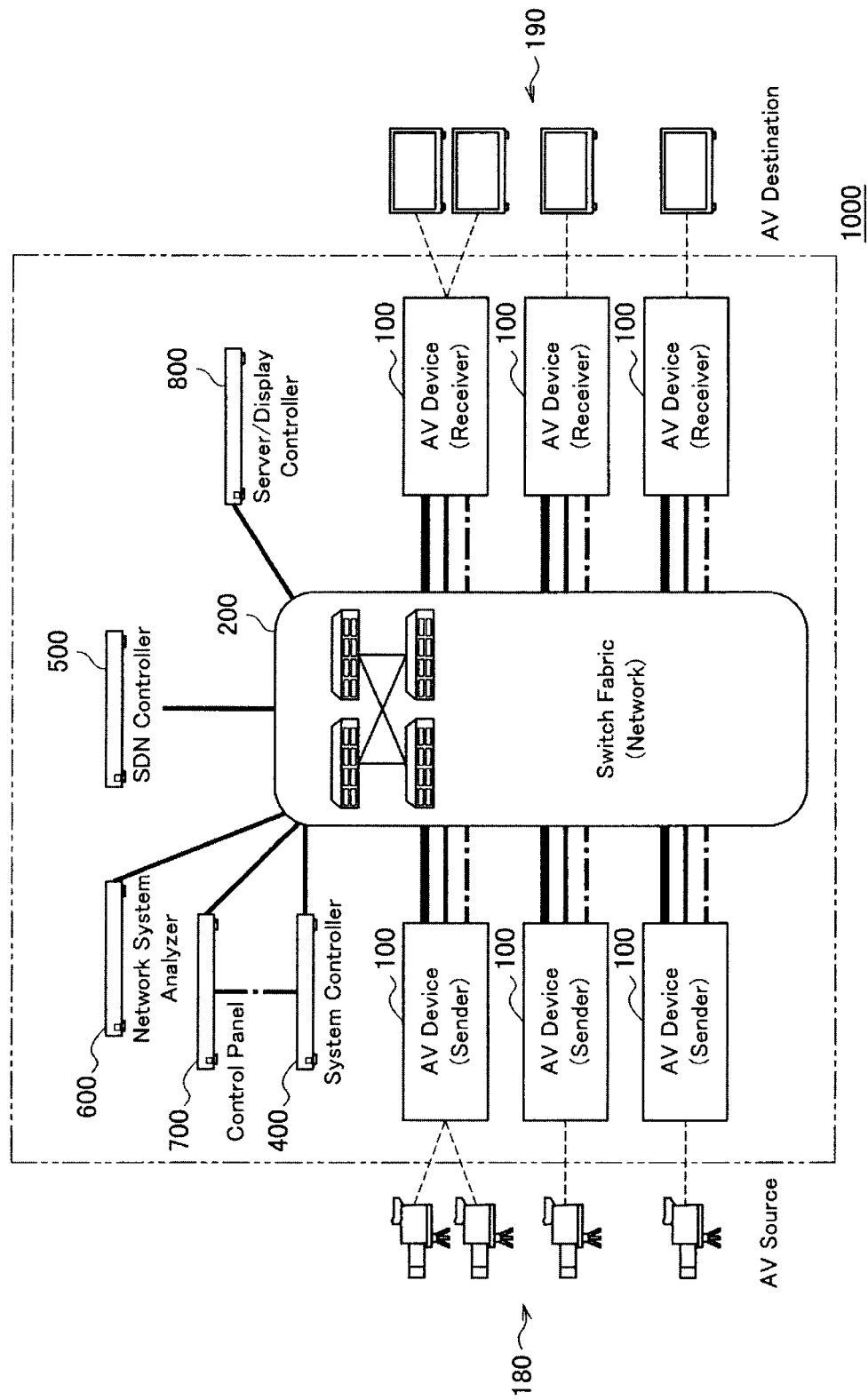
FIG. 1 is a schematic diagram illustrating a general configuration of a system according to an embodiment of the present disclosure.

Preferred embodiments of the present disclosure will be described in detail below with reference to the accompanying drawings. Note that in the present specification and drawings, components having substantially the same functional configuration are designated by the same reference numerals to eliminate duplicate description.

Note that the description will be given in the following order.
1. Outline of Present Disclosure
2. Application Example of Present Disclosure
3. Network Flow Monitoring using SDN
4. System Failure Analysis
4.1. Problem Analysis in Network
4.2. Problem Analysis in Non-IP Device
5. Problem Analysis Details
6. Application Example 1. Outline of Present Disclosure First, the outline configuration of a system 1000 according to an embodiment of the present disclosure will be described with reference to FIG. 1. As illustrated in FIG. 1, the system 1000 includes a plurality of AV devices 100, an IP switch 200, a system controller 400, an SDN controller 500, and a network system analyzer 600. The system 1000 also includes a control panel 700, a controller 800 for server or display. In FIG. 1, AV stream data and control data are transmitted and received between each AV device 100 and the IP switch 200. Further, control data is transmitted and received between the IP switch 200 and the system controller 400, the SDN controller 500, the network system analyzer 600, the control panel 700, or the controller 800. In FIG. 1, between each AV device 100 and the IP switch 200 and between the IP switch 200 and the system controller 400, the SDN controller 500, the network system analyzer 600, the control panel 700, the controller 800, or each AV device 100, AV stream traffic is indicated by a thick solid line, and control data traffic is indicated by a thin solid line. The control data traffic includes control data traffic of the network and control data traffic of the devices. Further, between the IP switch 200 and each AV device 100, a time synchronization signal is indicated by a dashed line. Note that the system controller 400 is a device that controls and switches the AV devices 100.

The plurality of AV devices 100 are each a device such as an IP converter. A device such as a camera, which serves as an AV source 180 on the transmitting side (corresponding to Sender in FIG. 1), is connected to the AV device 100 on the transmitting side. Further, a device such as a display, which serves as an AV destination 190 on the receiving side (corresponding to Receiver in FIG. 1), is connected to the AV device 100 on the receiving side. The AV source 180 or the AV destination 190 is communicated via HDMI (registered trademark). In a case where the AV device 100 is an IP converter, the AV device 100 performs an interface conversion between the AV source 180 or the AV destination 190 and the IP switch 200. Specifically, the AV device 100 converts an AV signal into an IPAV stream and converts an IPAV stream into an AV signal. In this example, video from a plurality of cameras are supplied to a plurality of displays via the IP switch 200. In FIG. 1, between each AV device 100 and the corresponding AV source 180 or AV destination 190, AV stream traffic is indicated by a broken line.

In the present embodiment, the devices in the region surrounded by a two-point chain line in FIG. 1, such as the AV devices 100, the IP switch 200, the system controller 400, the SDN controller 500, and the network system analyzer 600, are also referred to as IP devices. Further, the AV sources 180 or the AV destinations 190 are also referred to as non-IP devices.

In the system 1000 of the present embodiment, SDN (Software Defined Networks) is used to design a flexible network. SDN is an architecture in which a network is centrally managed by a network controller (SDN controller 500) and resources can be dynamically allocated. As a result, it is possible to flexibly distribute the traffic load according to the application without being restricted by the switch functions and the protocols for the existing network.

The network system analyzer 600 is a component for monitoring, and performs a problem analysis in the network and a problem analysis in a non-IP device. The network corresponds to an IP network in the region surrounded by the two-point chain line in FIG. 1. Performing the problem analysis in the network and the problem analysis in the non-IP device makes it possible to perform the problem analysis of the entire system 1000 illustrated in FIG. 1. These will be described in detail below.

The system controller 400, the SDN controller 500, the control panel 700, and the controller 800 for server or display are components for control. These components are configured to include, for example, a central processing unit such as a CPU, and software (program) for operating the central processing unit. Some or all of the system controller 400, the SDN controller 500, the control panel 700, and the controller 800 for server/display may be integrally configured.

The system controller 400 controls the entire system 1000. The control panel 700 is a user interface for the user to give operation information to the system 1000. The controller 800 controls a server for control or a display for control.

Further, the system 1000 of the present embodiment visualizes the network topology so that the visualization on a per-flow basis can lead to improvement in the operation management.

2. Application Example of Present Disclosure

In the system 1000 of the present disclosure, it is assumed that IP transmission for audio and video, that is, AV transmission, is provided as an example. In this system 1000, IP transmission is performed between the AV devices 100. The AV sources 180 to be expected include, for example, an image capturing and/or captured image transmitting device such as a camera, an AV streaming server, a video conferencing system device, and a video conferencing system camera, a surveillance camera, and a PC display. Further, the AV destinations 190 to be expected include, for example, a PC display, a large display for such as a video conference, a projector, and a recording server. The large display may include a CLED (Crystal LED Display).

In this system 1000, it is assumed that AV streaming is switched by using IP, and it is also assumed that AV signals of the AV sources 180 are converted into IP packets to transmit the resulting packets over the network. When transmitted from the network to the AV destination 190, the IP packets are converted into AV signals.

The AV signals before converted into IP packets may be compressed. The AV signals may be converted into IP packets to be transmitted as an RTP stream, or another transmission method may be used. It is also assumed that the AV signals are transmitted by multicast in order to improve the efficiency of the AV signals. It also includes some failure analysis functions in general IP systems that are not limited to AV systems.

Figure 2:
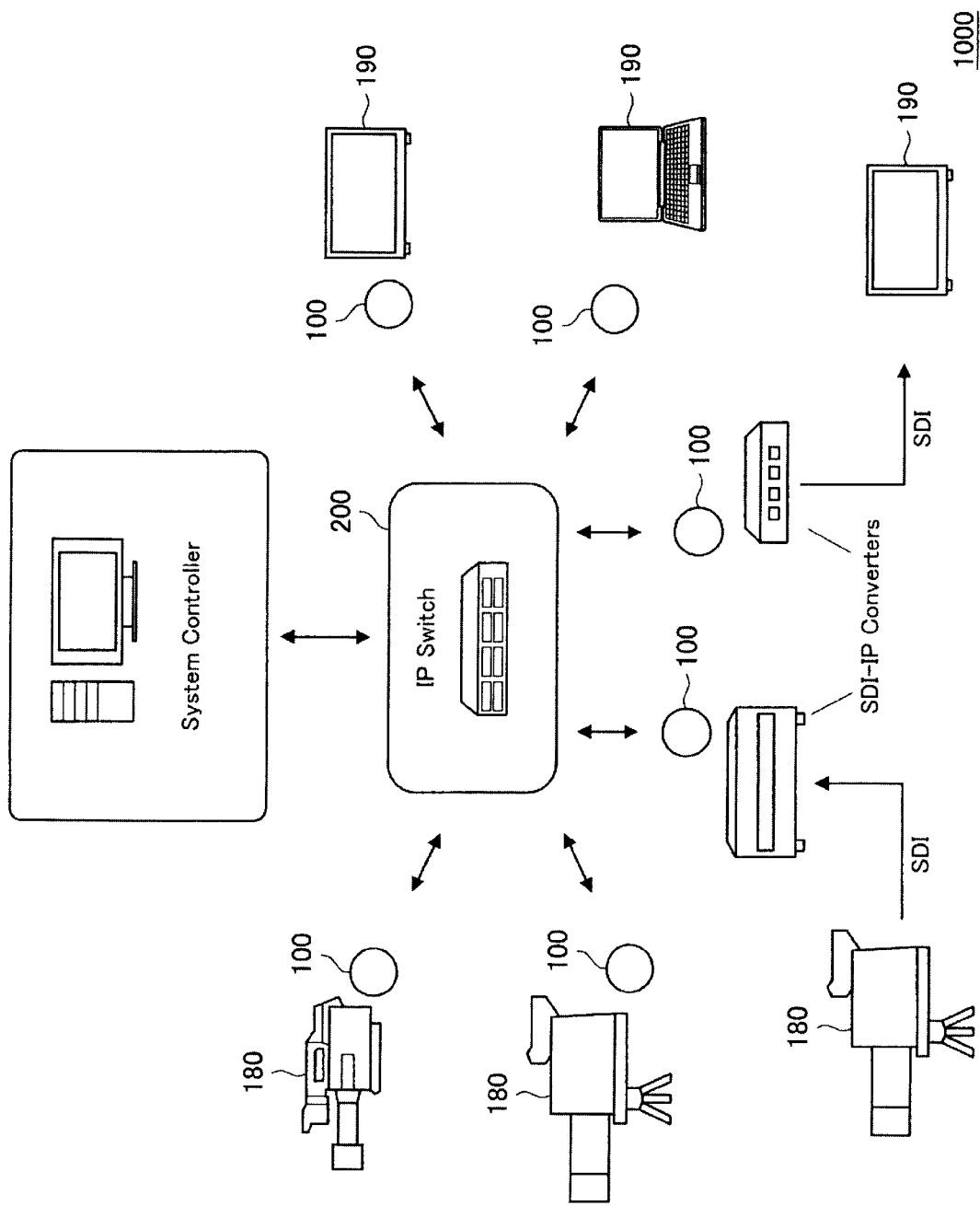
FIG. 2 is a schematic diagram illustrating a specific application example of the present disclosure.
Figure 3:
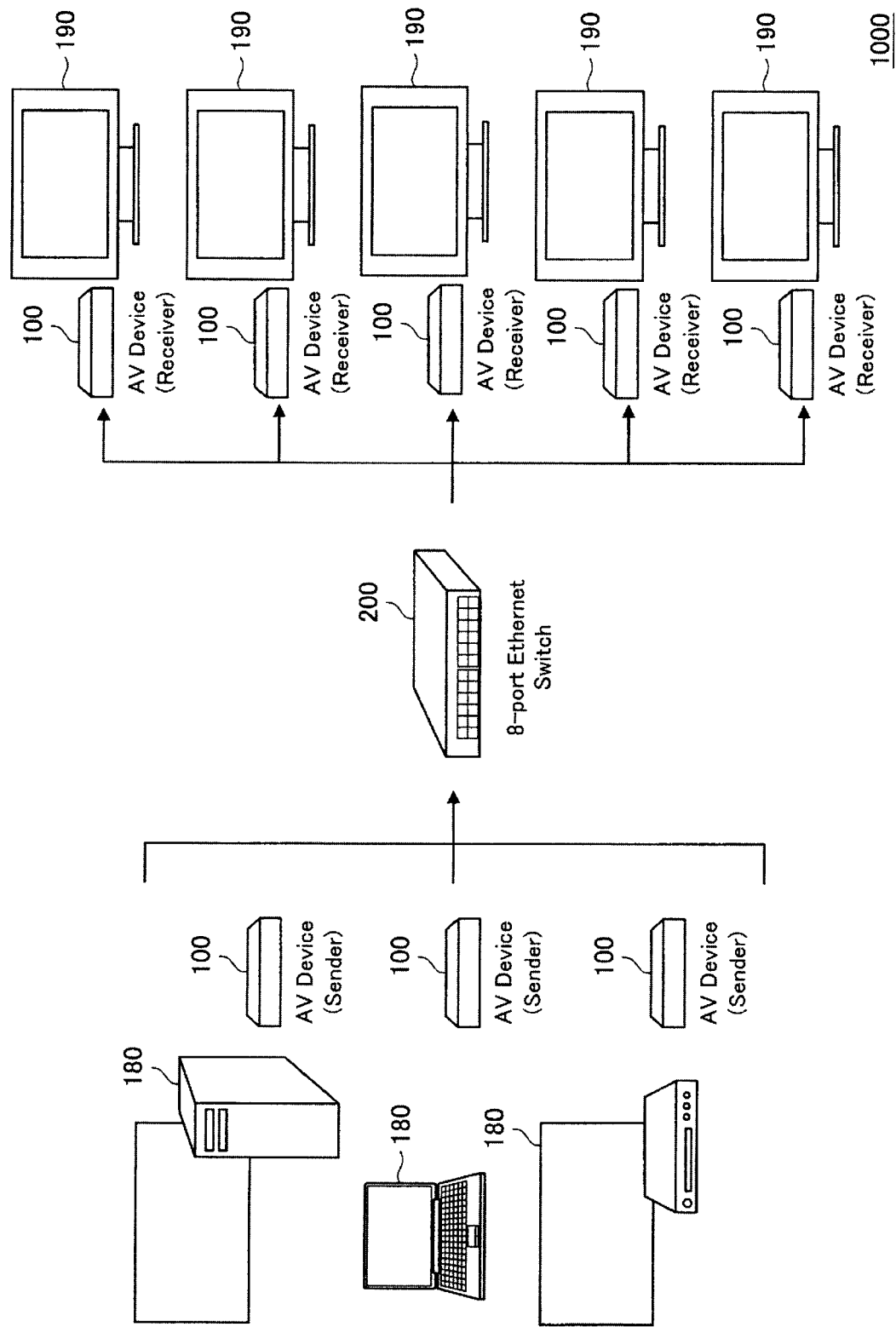
FIG. 3 is a schematic diagram illustrating a specific application example of the present disclosure.
Figure 4:
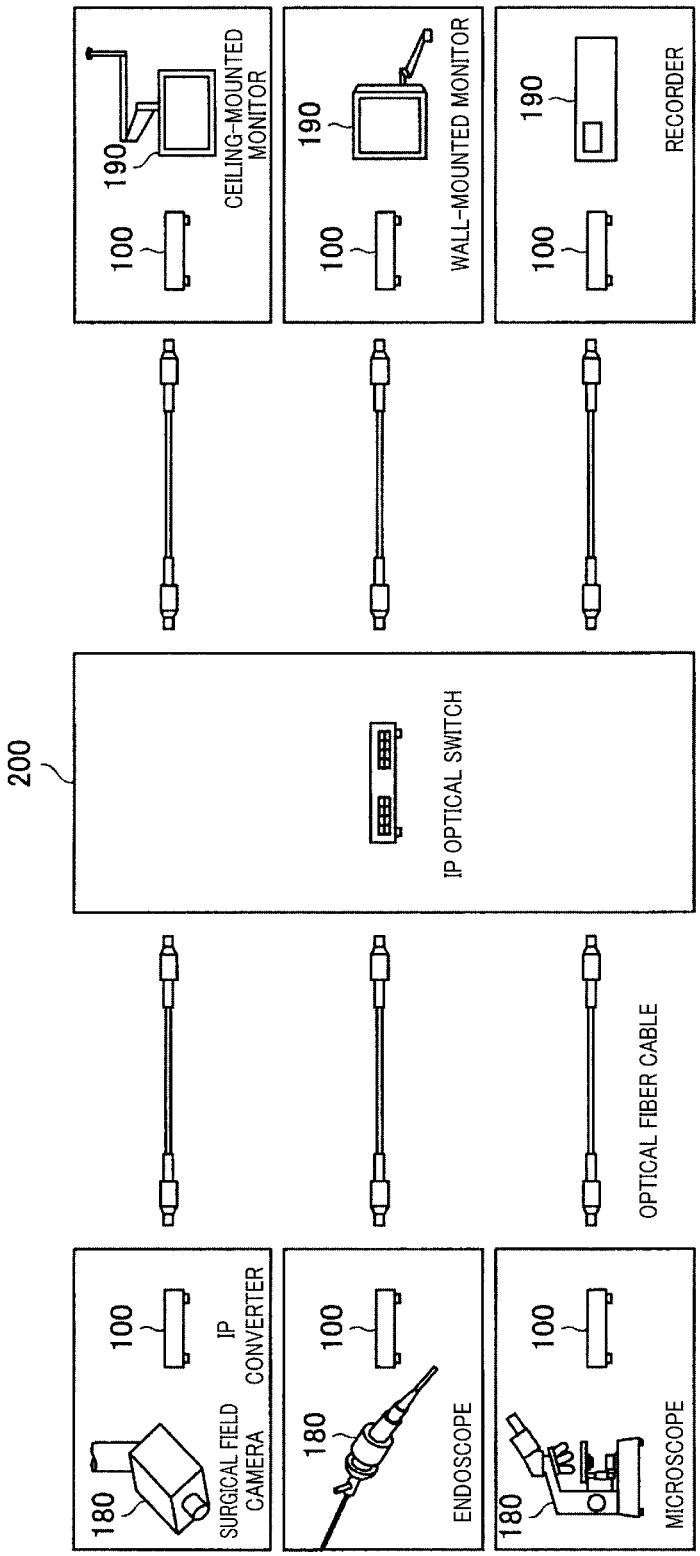
FIG. 4 is a schematic diagram illustrating a specific application example of the present disclosure.

FIGS. 2, 3, and 4 are schematic diagrams illustrating specific application examples of the present disclosure. FIG. 2 illustrates the system 1000 for broadcasting stations. In the system 1000 of FIG. 2, the AV sources 180 are devices such as a camera, an AV production switcher, and a streaming server. Further, the AV destinations 190 are devices such as various displays and storages. In the example illustrated in FIG. 2, it is assumed that each AV device 100 is built in the AV source 180 or the AV destination 190.

FIG. 3 illustrates the system 1000 for businesses. In the system 1000 of FIG. 3, the AV sources 180 are devices such as a PC screen and a streaming server. Further, the AV destinations 190 are devices such as various displays and storages. In the example illustrated in FIG. 3, each AV device 100 is configured separately from the AV source 180 or the AV destination 190.

FIG. 4 illustrates the system 1000 for medical use. In the system of FIG. 4, the AV sources 180 are devices such as a surgical field camera, an endoscope, and a microscope. The AV destinations 190 are devices such as a ceiling-mounted monitor, a wall-mounted monitor, and a recorder. In the example illustrated in FIG. 4, it is assumed that each AV device 100 is built in the AV source 180 or the AV destination 190.

In the present embodiment, network flow monitoring using SDN and system failure analysis are performed. As the system failure analysis, a failure analysis of a system composed of IP devices and a failure analysis of a system composed of non-IP devices are performed.

3. Network Flow Monitoring using SDN

A bunch of traffic that satisfies a specific condition is defined as a flow among the traffic flowing on the network. For example, a traffic using a specific multicast address is an AV flow or an AV stream. The flow is defined by a user operation c (e.g., as a traffic flow for AV device control), by application use cases (e.g. as a traffic flow for synchronization, an APR traffic flow for address explanation), and the like, as necessary. For a specified flow, the network system analyzer 600 acquires and visualizes statistical information of the flow by an SDN function capable of acquiring the statistical information of the flow or a function of performing detailed analysis of packets obtained by a packet capture device. Here, a visualization of the network topology will be described. In the existing network, it is not possible to perform monitoring on a data flow basis, for example, on a multicast basis. On the other hand, using SDN makes it possible to manage flow information in the IP switch 200, so that a data flow monitoring function can be provided. In the present embodiment, the SDN controller 500 centrally manages the network by using SDN so that the network topology between the AV devices is visualized.

The SDN controller 500 can acquire the statistical information of a data flow from the IP switch 200. Specifically, the SDN controller 500 can acquire information on a data flow from a leaf switch and a spine switch which constitute the IP switch 200.

Further, the SDN controller 500 can acquire connection information from the end device (each AV device 100) and flow information output by each end device. A flow display control unit included in the SDN controller 500 controls the display of the flow information between the end devices based on the information on the data flow obtained from the IP switch 200 and the flow information output from each AV device 100 obtained from the AV device 100. Using SDN makes it possible to monitor such flow information that statistical-information-based monitoring would fail to acquire, so that accurate monitoring on a per-flow basis can be performed.

Further, the flow display control unit controls the display of the flow information separately for each network traffic. For example, a multicast traffic list, a unicast traffic list, and a broadcast traffic list are displayed separately.

Further, the route information and the transfer table of the IP switch 200 are referred to as UI information and displayed, and a route is determined by watching the amount of traffic actually flowing through the IP switch 200 and displayed.

FIG. 5 is a schematic diagram illustrating display information in which a network topology is visualized, generated by the flow display control unit of the SDN controller 500. The information illustrated in FIG. 5 is displayed on a display (control panel 700) or the like based on the route information and according to the data flow of the actual traffic. The SDN controller 500 recognizes the data flow in the IP switch 200 and acquires the flow information output by the end device (AV device 100) in the network, thereby making it possible to generate the information illustrated in FIG. 5.

As illustrated in FIG. 5, a system configuration is displayed on the left side. A state is illustrated where AV devices 150, 152, and 154 are connected via the IP switch 200 and the SDN controller 500 is connected to the IP switch 200.

Further, in the upper right of FIG. 5, a flow list is illustrated including, for example, the bit rate (=8,560,557, 792 bps) and the amount of data (=53911911992 bytes) of a multicast AV stream of the AV device 152 (IPC_TX1). Further, the bit rate (=384 bps) and the amount of data (=3006300) of broadcast data of control data from the AV device 154 (IPC_RX1) are illustrated therein.

Further, in the lower right of FIG. 5, flow information for each switch of the IP switch 200 is illustrated. Thus, both the information on data flows in the AV devices 150, 152, 154 and the information on data flows in the IP switch 200 are visualized using the UI, so that the user can recognize the data flow flowing from the transmitting AV device 100 to the receiving AV device 100 via the IP switch 200. Further, the information in which the network topology is visualized as illustrated in FIG. 5 reflects a change of the network system, so that the data flow can be recognized flowing from the transmitting AV device 100 to the receiving AV device 100 via the IP switch 200 even in a case where an AV device 100 is further added.

As described above, using the SDN technology makes it possible to provide the system that visualizes the end-to-end flow on the network. In addition, using the SDN technology makes it possible to provide the system that visualizes both control traffic and AV traffic.

Protocols such as sFlow, NetFlow, and OpenFlow can be used to monitor the network. In addition, SNMP, a protocol for independent monitoring, or the like can be used for device monitoring.

Figure 6:
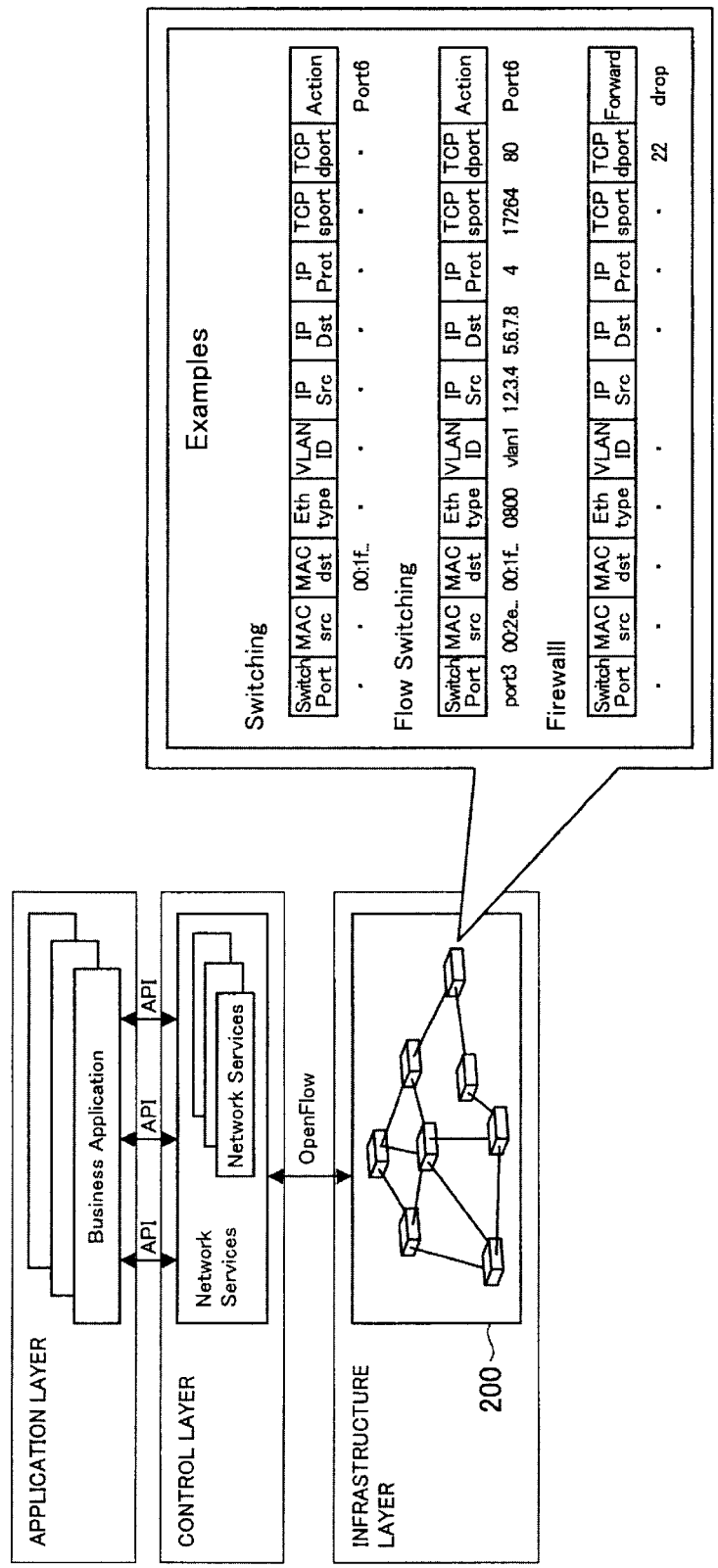
FIG. 6 is a schematic diagram illustrating the outline of OpenFlow.

FIG. 6 is a schematic diagram illustrating the outline of OpenFlow. OpenFlow is one of the technologies for implementing SDN, and is a technology that allows one control device to centrally manage network devices to perform complicated transfer control and flexibly change the network configuration. In OpenFlow, the "routing function" and the "data transfer function", which are defined inside a typical network device, are separately used. OpenFlow includes an "OpenFlow controller" and an "OpenFlow switch".

Figure 7:
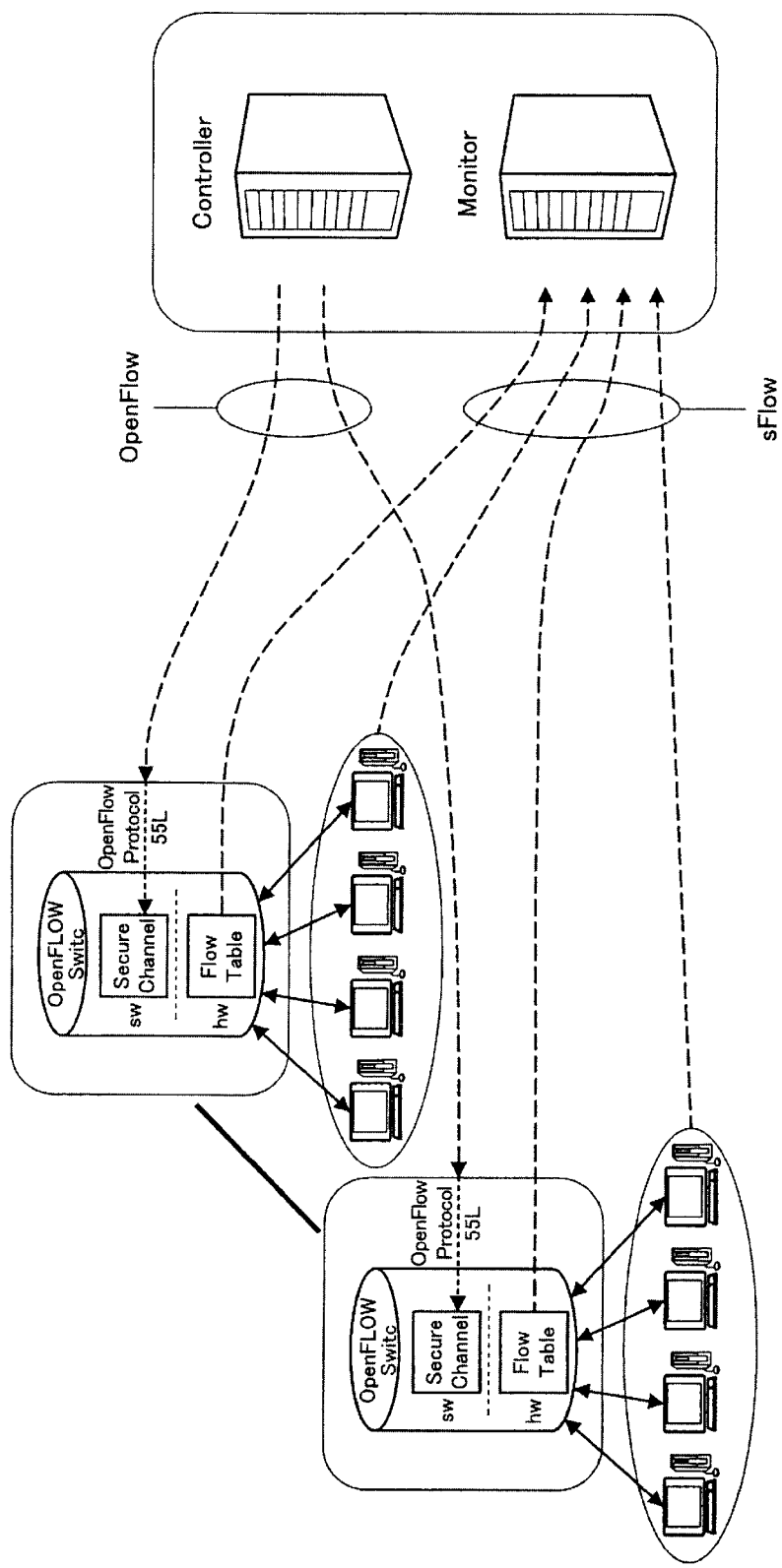
FIG. 7 is a schematic diagram illustrating an example using OpenFlow and sFlow for network monitoring.

FIG. 7 is a schematic diagram illustrating an example using OpenFlow and sFlow for network monitoring. In a case of using OpenFlow, the SDN controller 500 defines a flow to be used as basic control. It is possible to monitor flows in the network from the statistical information of the flow for control. In OpenFlow, it is possible to determine how much the amount of information (bytes, time) is flowing for a designated flow. Further, in a case of using sFlow, since sFlow is an application specific to monitoring, packet samples are captured for analysis and monitoring.

4. System Failure Analysis

Figure 8:
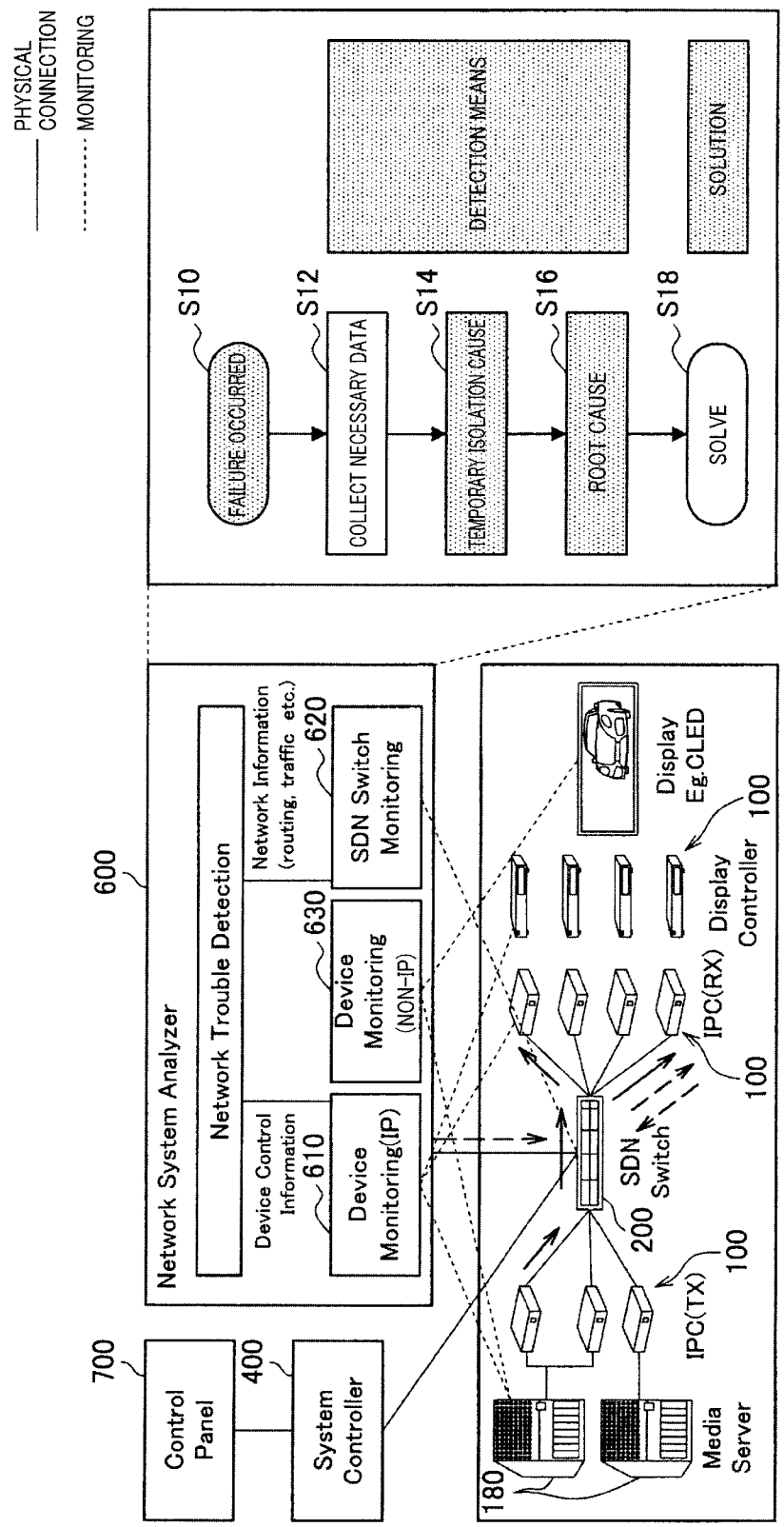
FIG. 8 is a schematic diagram illustrating the outline of a failure analysis function of the system according to the embodiment.

FIG. 8 is a schematic diagram illustrating the outline of a failure analysis function of the system according to the present embodiment. The failure analysis is performed by the network system analyzer 600. As illustrated in FIG. 8, the network system analyzer 600 includes an IP device monitoring unit 610 that monitors the IP devices, an SDN switch monitoring unit 620 that monitors the SDN switch (IP switch 200), and a non-IP device monitoring unit 630 that monitors the non-IP devices. The network system analyzer 600 is configured to monitor the IP switch 200 and monitor both the IP devices and the non-IP devices. An IP network monitoring unit is composed of the IP device monitoring unit 610 and the SDN switch monitoring unit 620. Each of the components of the network system analyzer 600, such as the IP device monitoring unit 610, the SDN switch monitoring unit 620, and the non-IP device monitoring unit 630, is configured to include a central processing unit such as a CPU and software (program) for operating the central processing unit.

FIG. 8 also illustrates the flow of failure analysis processing performed by the network system analyzer 600. When a failure occurs (step S10), necessary data is collected (step S12). Then, the primary isolation cause is determined (step S14), and the root cause is determined (step S16). Once the root cause is determined, the failure is resolved based on the root cause (step S18).

The system assumed in the present embodiment is as follows. The present embodiment can be applied to any of the following systems.
All IP System (Device/Network Failure Analysis)
IP/Legacy AV Switching Hybrid System (Device/Network Failure Analysis)
Legacy AV Switching (Device Failure Analysis)
In addition, this system is available in the following IP networks.
LAN Network
WAN Network
Wireless Network (e.g., 5G)
Mixed LAN/WAN/Wireless The network system analyzer 600 is configured to include software (program) having a failure analysis function. The network system analyzer 600 can be operated by a dedicated server. The network system analyzer 600 can also be operated by a server for the system controller 400. The network system analyzer 600 can also be operated by the CPU in the IP switch 200. The network system analyzer 600 can also be operated as a cloud server.

4.1. Problem Analysis in Network

The problem analysis in the network is mainly performed by the IP device monitoring unit 610 and the SDN switch monitoring unit 620 of the network system analyzer 600. In other words, the problem analysis in the network is performed by monitoring the IP devices and monitoring the IP switch 200 (SDN switch).

In the problem analysis in the network, the following failures are listed as a possible failure list.

(1) A controller, such as the system controller 400, and an AV device 100 fail to be connected to each other.

(2) Devices in the system, such as AV devices 100, fail to be time-synchronized (lock between Leader and Follower failed).

(3) Control does not work (transmission failed to start, video switching failed, settings disabled, etc.).

(4) An image fails to be output, images are broken.

The basic concept of isolating the problem when any one of the above-described failures occurs will be described below. When a problem occurs, the problem analysis can be made more efficient by isolating the problem into one of the following. This isolation is referred to as primary isolation. The primary isolation is mainly performed by the SDN switch monitoring unit 620.

Problem with packets related to control
Problem with packets related to AV streams
Problem with packets for synchronization Cause details are further obtained by identifying the cause of the problem as one of the following components.

Problem related to cables
Problem related to network switch (IP switch 200)
Problem with end devices (control/IPC) and settings The above isolation is mainly performed by the IP device monitoring unit 610 and the SDN switch monitoring unit 620. Note that the end device is an end device in the network and basically corresponds to the AV device 100. Accordingly, the end devices do not include non-IP devices.

FIGS. 9 to 12 are schematic diagrams illustrating a technique of problem isolation. As illustrated in FIGS. 9 to 12, the causes for the primary isolation can include AV packet (PKT) loss (A1) (a packet arrived or not arrived), AV packet jitter (A2), AV packet failed to arrive (A3), AV packet successfully arrived but broken or failed to be output (A4), control packet failed to arrive (B1), synchronization packet failed to arrive (C1), and synchronization packet jitter and/or delay (C2). Note that A1 to A4 are AV (video and audio) stream failures, B1 is a control stream failure, and C1 to C2 are synchronous stream failures.

The root causes can include cable unconnected (D1), connection port error (D2), cable problems such as cable quality and interference (D3), switch path setting problems (E1), band overflow (E2), number of switch hops (E3), switch failure (E4), IP address duplication (F1), device setting error (F2), controller setting error (F3), device failure (F4), controller failure (F5), and unknown traffic (F6). D1 to D3 are problems with cables, E1 to E4 are problems with the IP switch 200, and F1 to F6 are problems with the AV device 100.

The detection means can include LinkUp+MAC+Neibor Port (G1), ARP check with the SDN controller 500 (G2), loss check with the IP switch 200, the SDN controller 500, and the AV device 100, and identification of loss point (G3), check for any problems based on the network configuration, settings, and route acquired by the SDN controller 500 (G4), check of traffic volume with the SDN controller 500 (G5), check of the switch settings and switch status (G6), check of duplicate IP address with the SDN controller (G7), check of device settings and status (G8), check of controller settings and status (G9), and detection with sFlow/NetFlow (G10). More specifically, G5 checks for any unexpected flows, G7 allows duplicate devices to be isolated, G8 checks for traffic arrival and any traffic or decoding errors, and G9 checks for traffic arrival and any setting errors.

Solutions can include: connect the cable (H1), re-plug the cable in accordance with instructions (H2), replace the cable (H3), reset the settings of the SDN controller based on the analysis result (H4), reset the switch settings based on its check result (H5), reset the IP address without duplicate (H6), reset the device settings based on the status check result (H7), reset the controller settings based on its check result (H8), and block the unknown traffic (H9).

Figure 9:
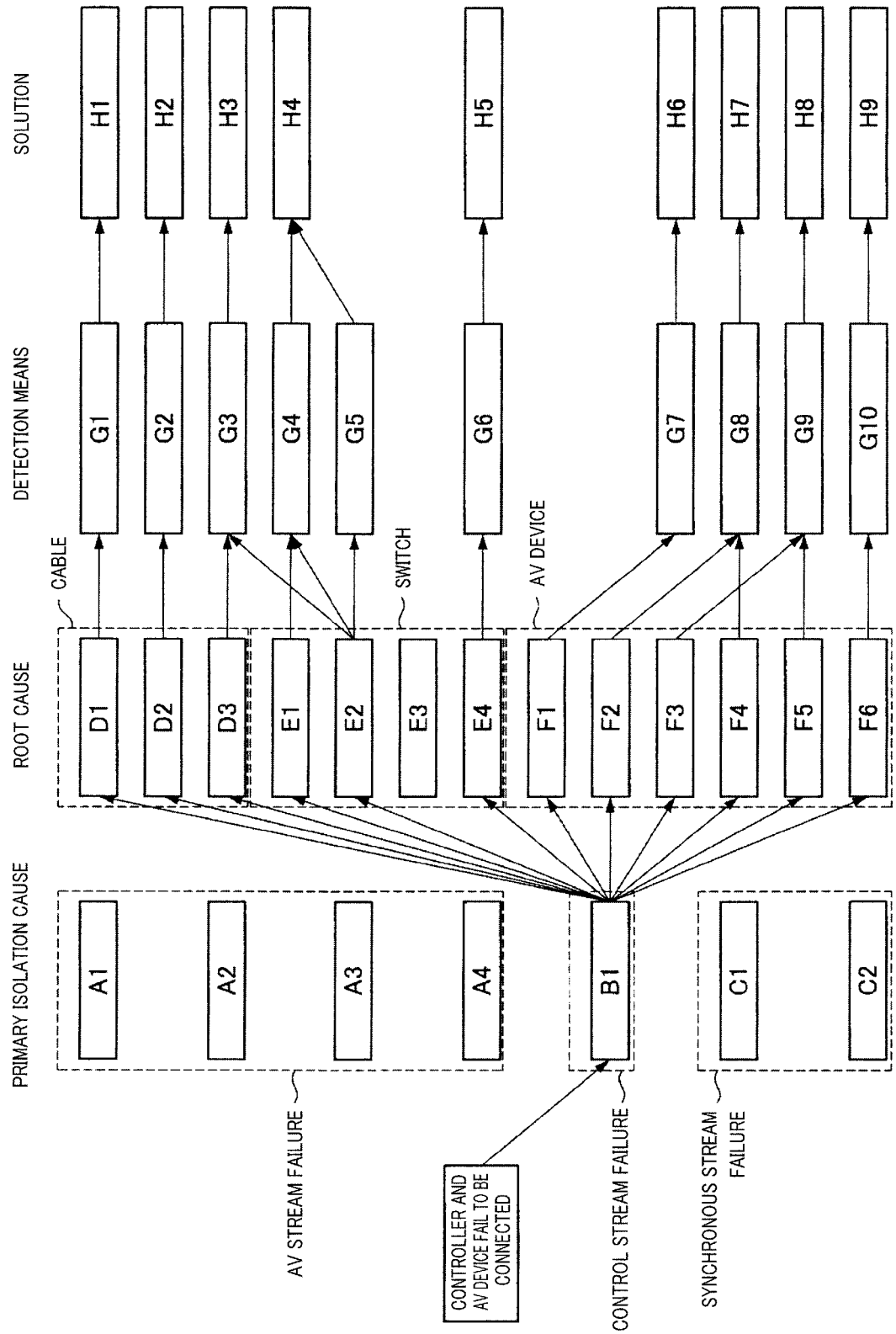
FIG. 9 is a schematic diagram illustrating a technique of problem isolation.

FIG. 9 illustrates a case where the controller and an AV device 100 fails to be connected to each other. In this case, it is regarded that there is a problem with the control stream, and as illustrated in FIG. 9, the primary isolation cause is a control packet failed to arrive (B1), and the root causes of D1 to D3, E1 to E4, and F1 to F6 are checked. Then, the location where the failure has occurred is identified by detection means G1 to G10, and the failure is solved by solutions H1 to H9. As illustrated by the arrows in FIG. 9, when the root cause is known, the failure is detected by the detection means corresponding to the root cause, and the failure is solved by the solution(s) corresponding to the detection means.

Figure 10:
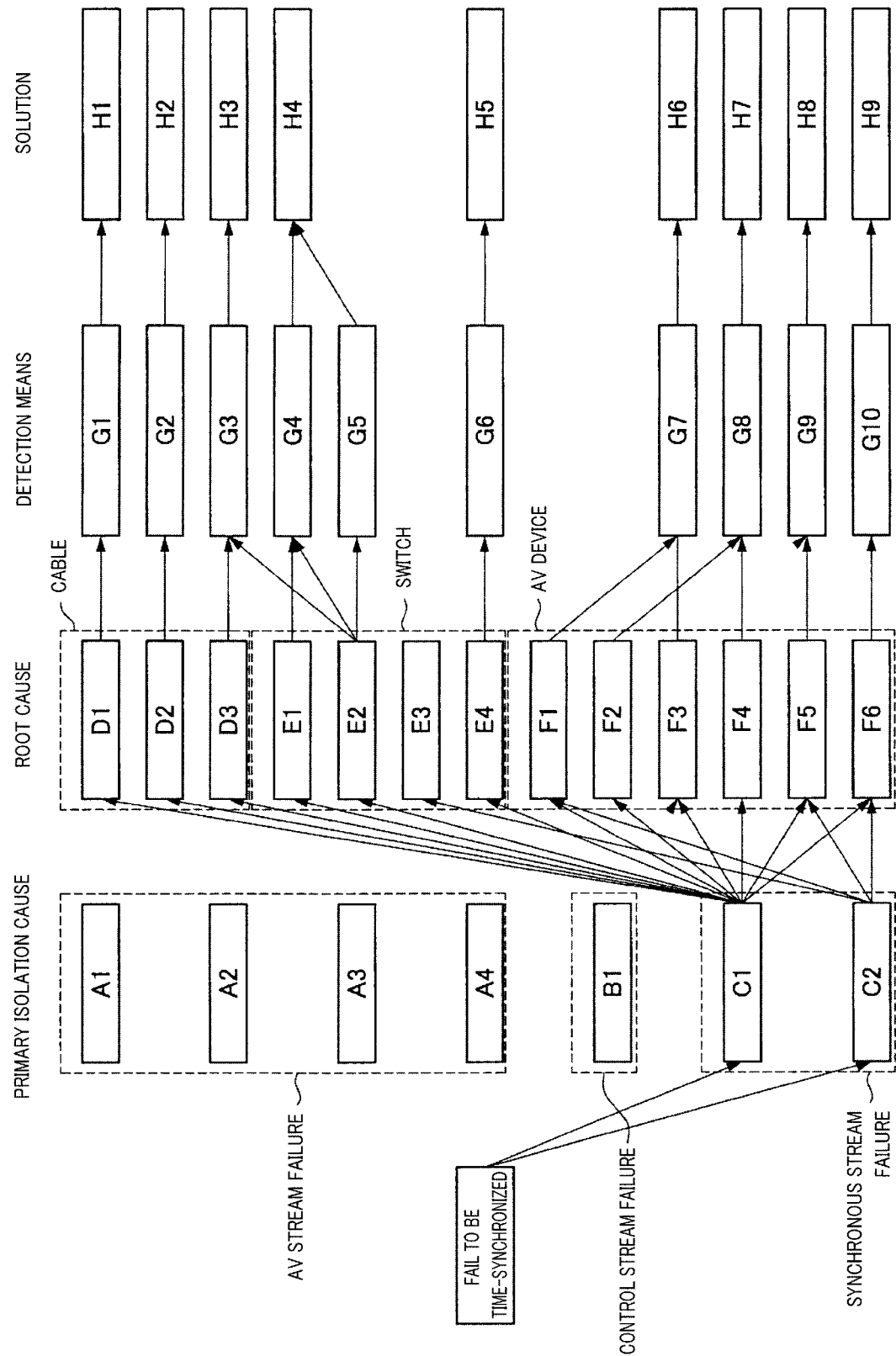
FIG. 10 is a schematic diagram illustrating a technique of problem isolation.

FIG. 10 illustrates a case of being not time-synchronized. In this case, as illustrated in FIG. 10, the primary isolation cause is a synchronization packet failed to arrive (C1), and the root causes of D1 to D3, E1 to E4, and F1 to F6 are checked. Then, the location where the failure has occurred is identified by detection means G1 to G10, and the failure is solved by solutions H1 to H9.

Figure 11:
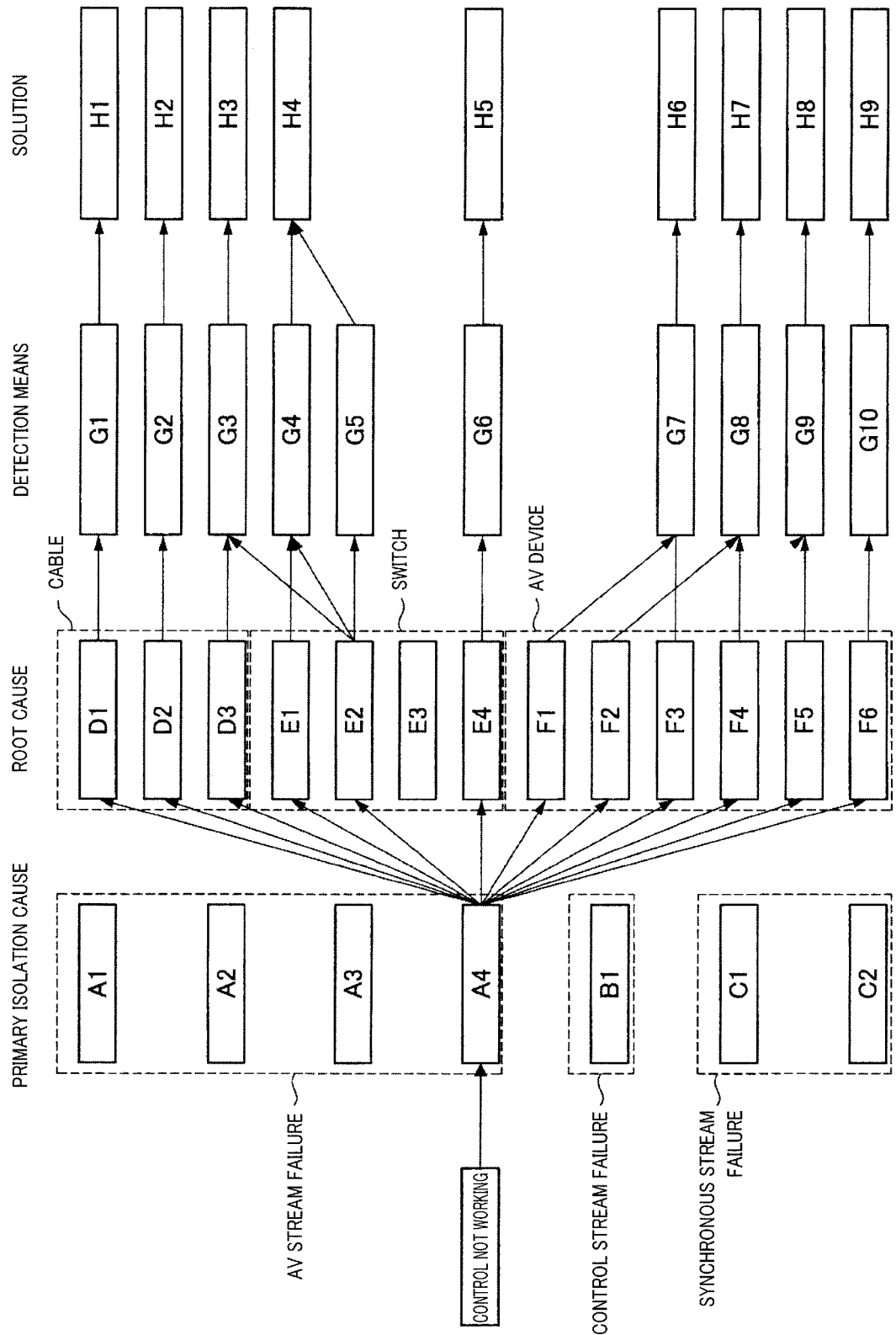
FIG. 11 is a schematic diagram illustrating a technique of problem isolation.

FIG. 11 illustrates a case where the control does not work (transmission failed to start, video switching failed, and settings disabled). In this case, as illustrated in FIG. 11, the primary isolation cause is a control packet failed to arrive (A4), and the root causes of D1 to D3, E1 to E4, and F1 to F6 are checked. Then, the location where the failure has occurred is identified by detection means G1 to G10, and the failure is solved by solutions H1 to H9.

Figure 12:
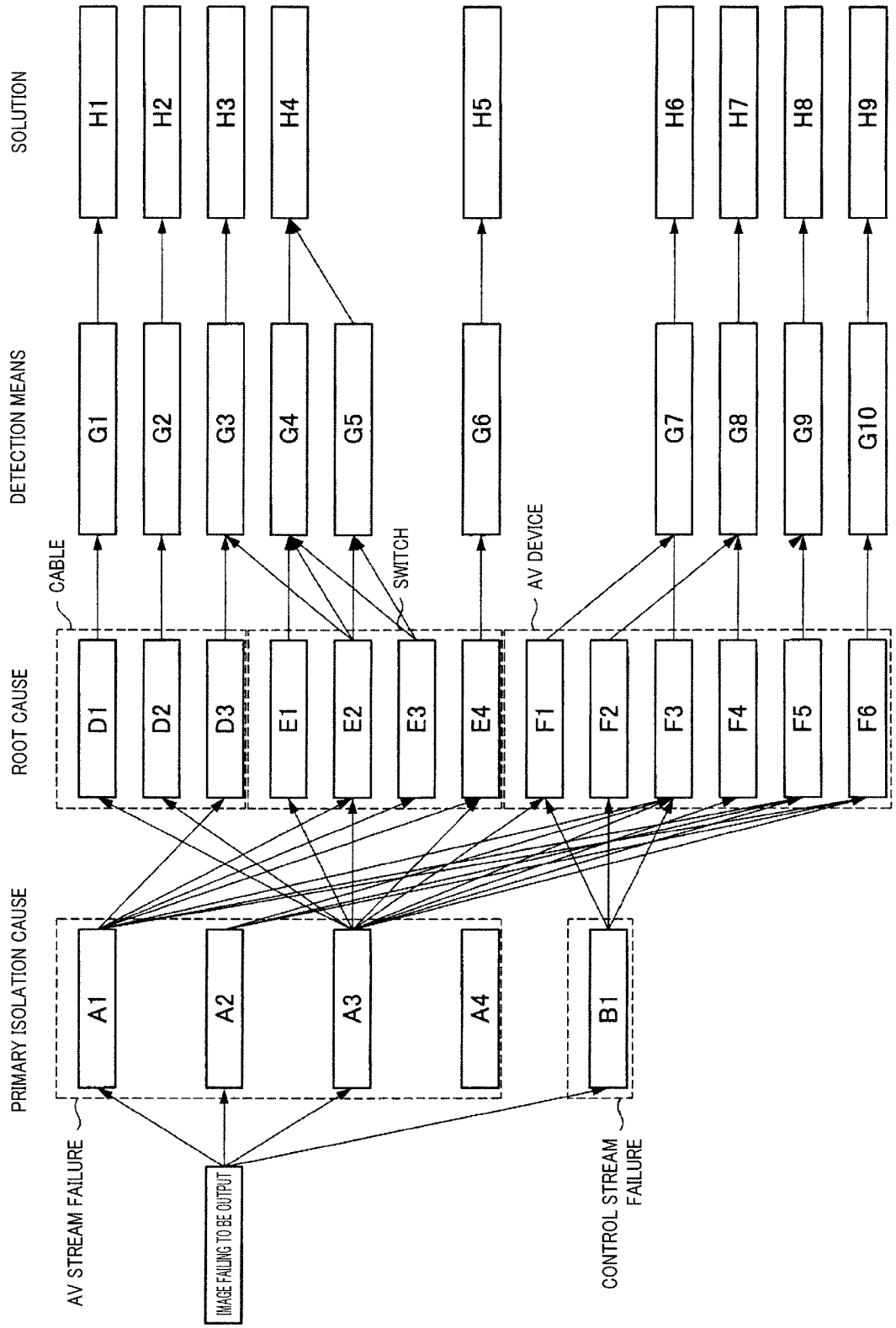
FIG. 12 is a schematic diagram illustrating a technique of problem isolation.

FIG. 12 illustrates a case where the image does not appear (the image is broken). In this case, as illustrated in FIG. 12, the primary isolation cause is any one of A1 to A3 and B1, and the root causes of D1 to D3, E1 to E4, and F1 to F6 are checked. Then, the location where the failure has occurred is identified by detection means G1 to G10, and the failure is solved by solutions H1 to H9. Also in FIGS. 10 to 12, as in FIG. 9, when the root cause is known, the failure is detected by the detection means corresponding to the root cause, and the failure is solved by the solution(s) corresponding to the detection means.

4.2. Problem Analysis in Non-IP Device

Figure 13:
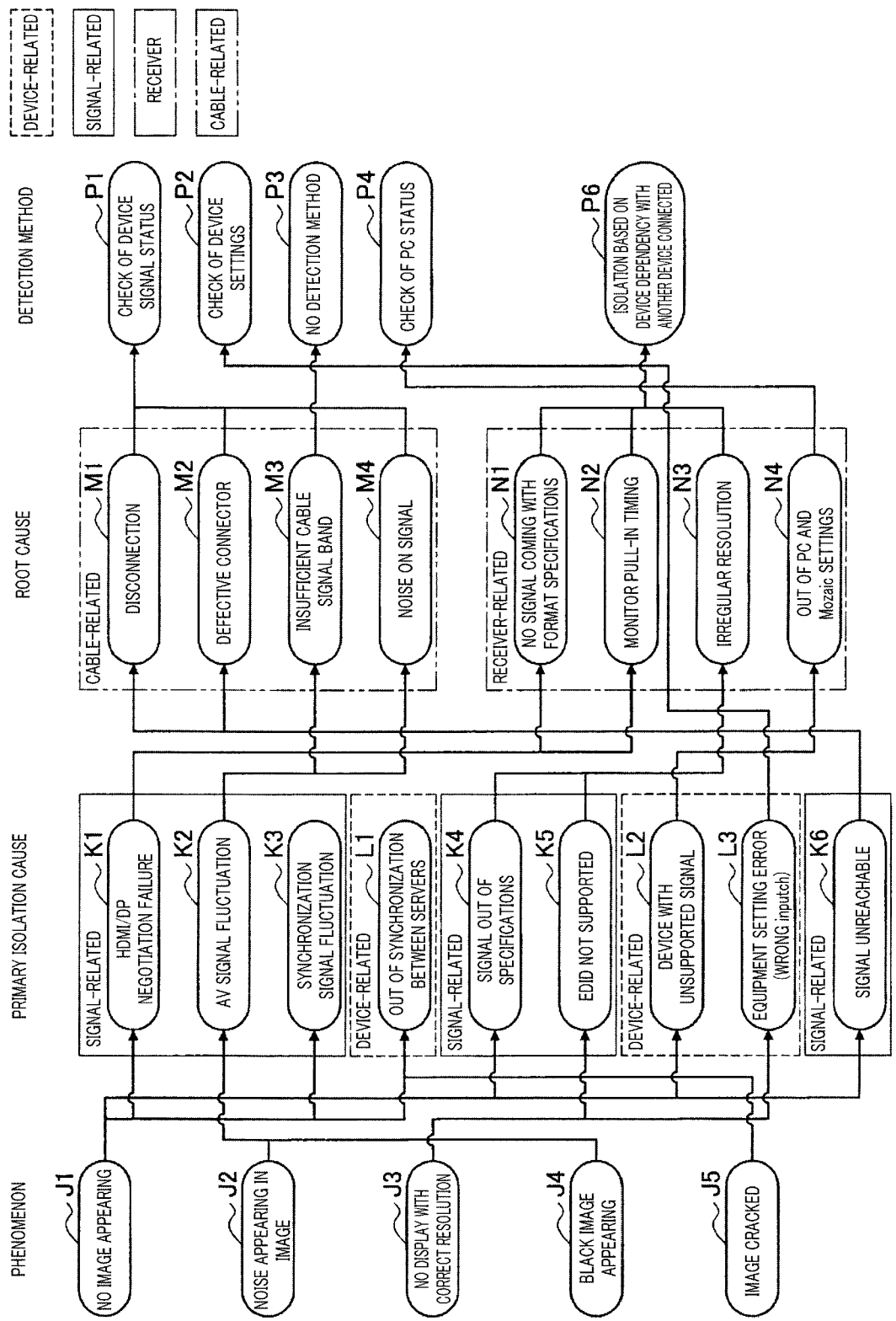
FIG. 13 is a schematic diagram illustrating a problem analysis in a non-IP device.

FIG. 13 is a schematic diagram illustrating a problem analysis in a non-IP device. Failure detection for a non-IP device is performed in a manner that the AV device 100 interfaces information on the corresponding AV source 180 or AV destination 190 communicating via HDMI (registered trademark) and then the network system analyzer 600 acquires the information. In FIG. 13, the reductions of failure can include no image appearing (J1), noise appearing in image (J2), no display with correct resolution (J3), black image appearing (J4), and image cracked (J5). In addition, the primary isolation causes can include HDMI (registered trademark)/DP negotiation failure (K1), AV signal fluctuation (K2), synchronization signal fluctuation (K3), out of synchronization between servers (L1), signal out of specifications (K4), EDID not supported (K5), device with unsupported signal (L2), equipment setting error (L3), and signal unreachable (K6). K1 to K5 are primary isolation causes related to signals, and L1 to L3 are primary isolation causes related to devices.

The root causes can include disconnection (M1), defective connector (M2), insufficient cable signal band (M3), noise on signal (M4), no signal coming with format specifications (N1), monitor pull-in timing (N2), irregular resolution (N3), and out of PC and mosaic settings (N4). M1 to M4 are root causes related to cables, and N1 to N4 are root causes related to receiving devices.

The detection methods can include, check of device signal status (P1), check of device settings (P2), no detection method (P3), check of PC status (P4), isolation based on device dependency with another monitor connected (P5), and isolation based on device dependency with another device connected (P6). Even in the problem analysis of non-IP devices, the root cause is determined based on the primary isolation, and when the root cause is known, the failure is detected by the detection means corresponding to the root cause, and the failure is solved by the solution corresponding to the detection means.

5. Problem Analysis Details

Figure 14:
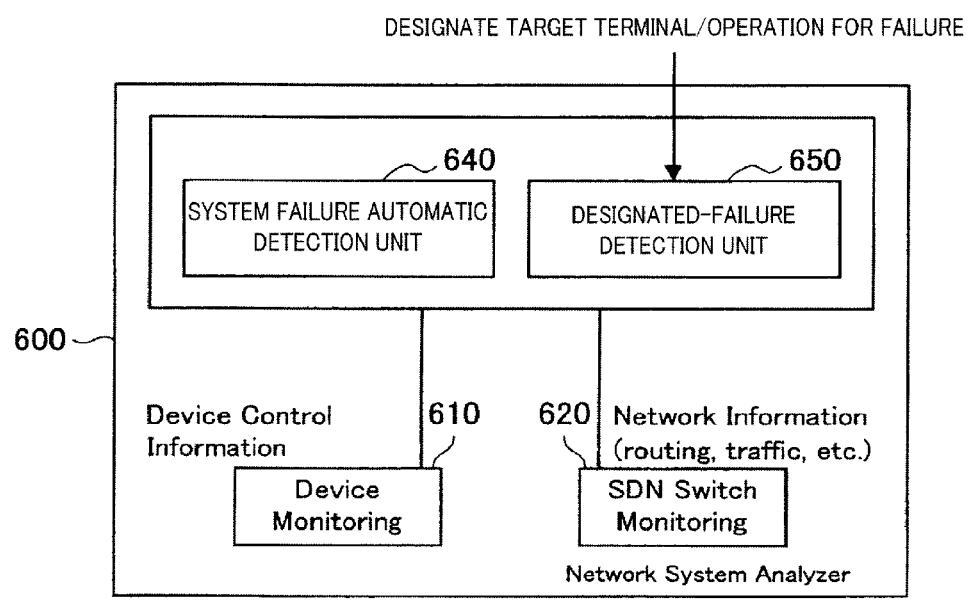
FIG. 14 is a schematic diagram illustrating a system failure automatic detection unit and a designated-failure detection unit, which are provided in a network system analyzer.

The above-described problem analysis will be described in more detail below. The problem analysis is roughly divided into system failure automatic detection and designated-failure detection. FIG. 14 is a schematic diagram illustrating a system failure automatic detection unit 640 and a designated-failure detection unit 650, which are provided in the network system analyzer 600.

The system failure automatic detection unit 640 constantly automatically detects a system failure and notifies the problem. The system failure automatic detection unit 640 also visualizes the problem as necessary and notifies a countermeasure. The designated-failure detection unit 650 automatically detects a selected terminal and a failure related to operations, and notifies the problem. The designated-failure detection unit 650 also has a function of visualizing the problem and notifying a countermeasure. The system failure automatic detection unit 640 and the designated-failure detection unit 650 each correspond to the detection means illustrated in FIGS. 9 to 12, and detect and determine the root cause.

Examples of possible system failure automatic detection of the system failure automatic detection unit 640 can include:
  Detection of erroneous connection port
  Detection of network cable link down
  Detection of network cable deterioration
  Detection of loss and packet error in network switches
  Detection of duplicate IP address
  Detection of band overflow
  Detection of unknown traffic For each system failure, the detection method and countermeasure will be described. For the detection of erroneous connection port, the detection means is inputting a possible network configuration to an SDN monitoring function, comparing the possible configuration with a result of detecting the network topology, and notifying of an error, if any. The input to the SDN monitoring function is file-based designation via UI. The countermeasure is indicating the erroneous point based on the comparison result, and notifying of a correction method.

For the detection of network cable link down, the detection means is constantly monitoring the link up status of the network cables, and notifying a link down port to be used, if any. The countermeasure can include notifying the link down location, issuing a countermeasure plan, unplugging and plugging the cable, replacing the cable, disconnecting and connecting the transceiver, replacing the transceiver, replacing the end device, and replacing the switch.

For the detection of network cable deterioration, the detection means is constantly monitoring the cable quality in response to a switch check command, and notifying of a cable quality level exceeding a threshold value, if any. The countermeasure is recommending replacing the related cable, and if any of the cables is not the cause, recommending replacing the transceiver is recommended. If neither any of the cables nor the transceiver is the cause, replacing the switch is recommended.

For the detection of loss and packet error in network switches, the detection means is constantly detecting the loss and the packet error for each network switch interface, and constantly detecting the loss and the packet error for each network switch flow. The countermeasure is recommending replacing the cable of the related link is recommended, detecting whether there is any other related failure, and notifying of a countermeasure (switch temperature, bandwidth overflow, etc.).

For the detection of duplicate IP address, the detection method is constantly monitoring an ARP and an ARP reply by the SDN controller 500, holding a list of IP addresses/MACs in use in the SDN controller 500, and notifying of an IP address in use being also in use for another device, if any. The countermeasure is notifying of duplicate information, and attempting to change one of the IP addresses. Basically, the IP address for the device set later is changed. The SDN controller 500 blocks the second device from connecting to the system.

For the detection of band overflow, the detection means is acquiring information on the maximum bandwidth available for each device is acquired from the device monitoring function, and notifying of the maximum traffic volume for each terminal exceeding the physical bandwidth of the interface, if any. The detection means includes notifying of the actual traffic of the network exceeding an expected physical bandwidth, if any. The countermeasure is notifying of the location of the standby overflow and how much bandwidth will overflow, and then redesigning and constructing the network as necessary.

For the detection of unknown traffic, the detection means is taking the statistics of the flows flowing under sFlow and Netflow, and notifying of an unexpected traffic found, if any. The countermeasure is notifying that there is an unknown traffic, and blocking the unknown traffic as necessary.

Figure 15:
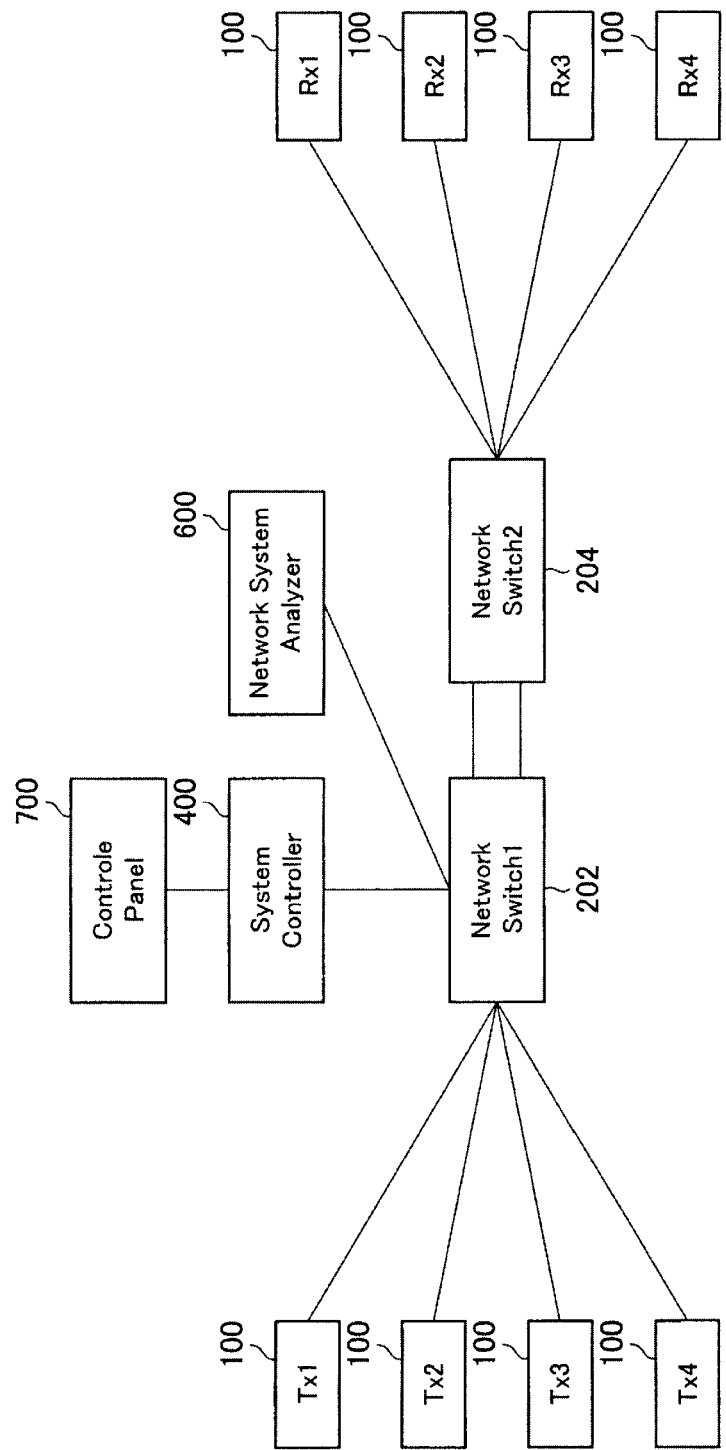
FIG. 15 is a schematic diagram for explaining a designated-failure detection.
Figure 16:
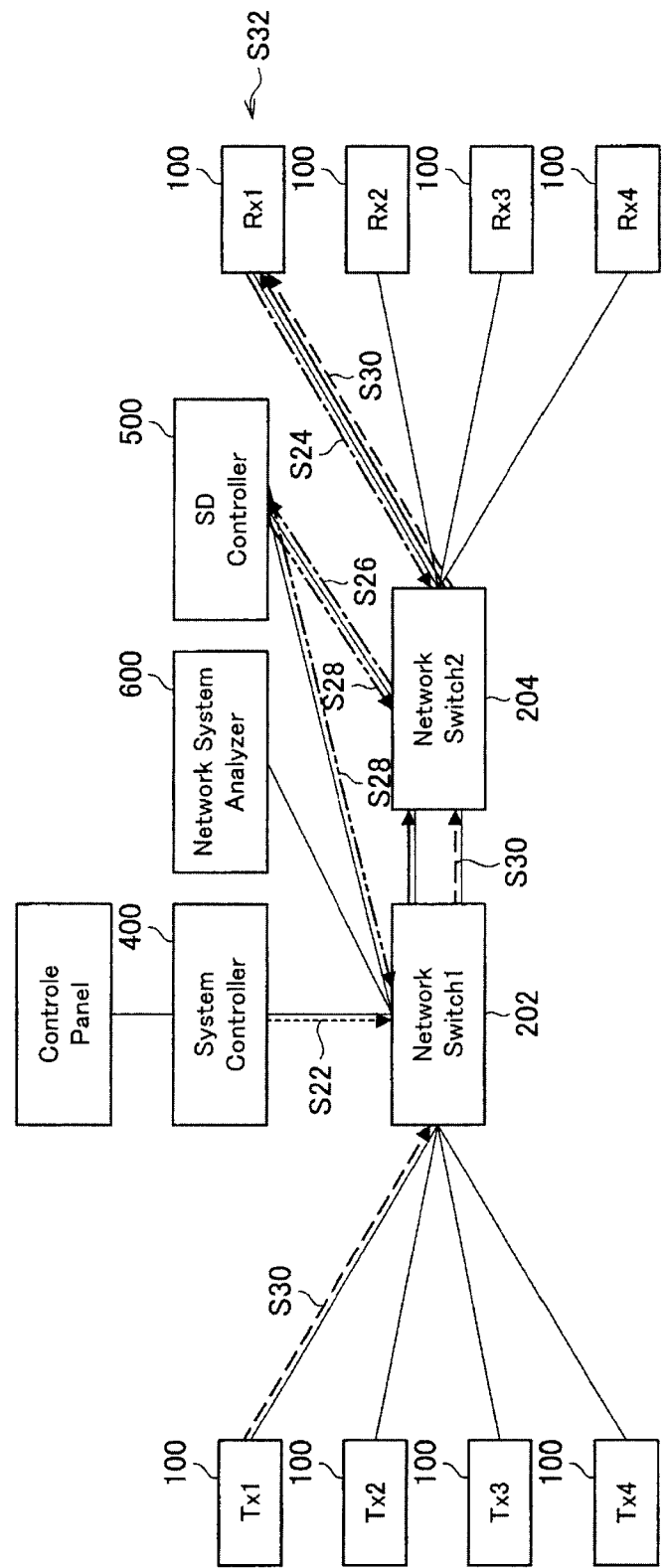
FIG. 16 is a schematic diagram for explaining a designated-failure detection.
Figure 17:
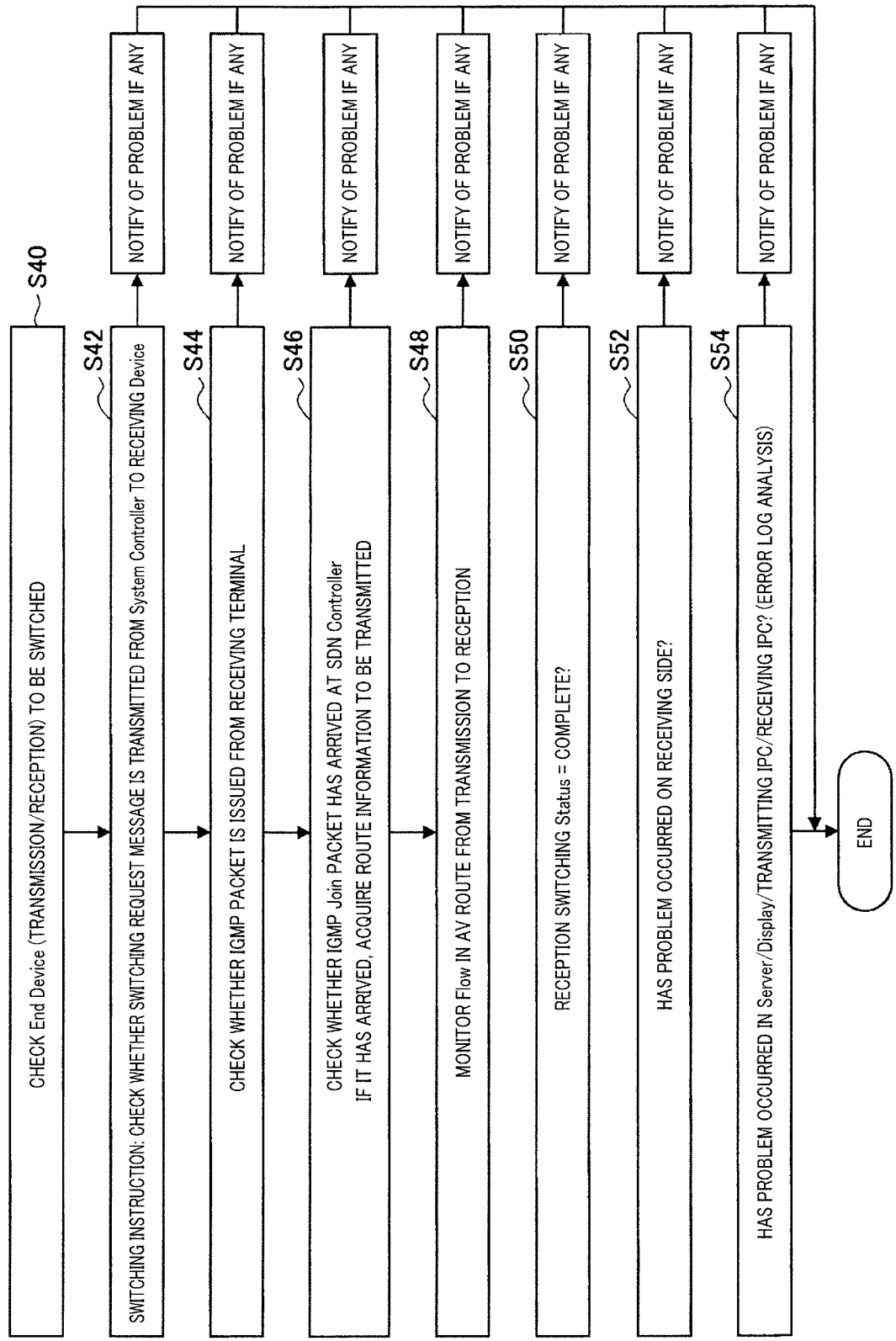
FIG. 17 is a flowchart illustrating a problem analysis flow of the designated-failure detection.

FIGS. 15 to 17 are schematic diagrams for explaining the designated-failure detection. Some failures cannot be analyzed without an external trigger, and such a failure is called a designated failure. For the designated failure, the external trigger is performed by one of the following three methods. The methods are "designating from the UI of the failure analysis function", "notifying with an API call from the system controller", and "identifying by performing analysis in the failure analysis function". The designated-failure detection unit 650 detects a failure by collating whether or not a designated operation is performed with the IP device and the IP network. Note that the failure detection based on the designated operation is performed by the IP device monitoring unit 610 or the non-IP device monitoring unit 630. The method of "designating from the UI of the failure analysis function" is described in the following example. A designated failure is, for example, a case where a problem occurs that a video is not actually switched in response to switching the video through the control panel 700. Here, an analysis on the case where a video is not actually switched in response to switching the video through the control panel 700 will be described by way of example. Specifically, a case will be described where a video is not actually switched to the video of Tx1 in response to switching the video displayed by Rx1 to the video of Tx1 in accordance with an input through the control panel in FIG. 15. FIG. 15 illustrates the system 1000 of the present disclosure as in FIG. 1, and illustrates an example in which one IP switch 202, 204 is provided. Note that although not illustrated, the transmitting AV devices 100 (Tx1 to Tx4) are integrally configured with the respective AV sources 180, and the receiving AV devices 100 (Rx1 to Rx4) are integrally configured with the respective AV destinations 190.

FIG. 16 is a schematic diagram for explaining a flow of switching videos in the system illustrated in FIG. 15. First, an event is started, and the video displayed by Rx1 is switched to the video of Tx1 through the UI of the control panel. Next, in step S22, the system controller 400 issues a switching instruction to the IP switch 202 (network switch 1) so as to switch the video displayed by Rx1 to the video of Tx1. Next, in step S24, Rx1 issues a join request to the IP switch 204 (network switch 2). The join request is a request for a video using IGMP. Next, in step S26, the IP switch 204 (network switch 2) sends an Rx1 join request to the SDN controller 500. In FIG. 16, the join requests are each indicated by a dashed-dotted line arrow.

Next, in step S28, upon receiving the join request, the SDN controller 500 instructs the IP switches 202 and 204 to add an AV transmission flow from Tx1 to Rx1. In FIG. 16, the instruction for adding the AV transmission flow is indicated by a two-point chain line arrow. Next, in step S30, upon receiving the join request, an AV transfer flow reaching Rx1 from Tx1 via the IP switch 202 (network switch 1) and the IP switch 204 (network switch 2) is added. In FIG. 16, the added AV transfer flow is indicated by a broken line arrow.

Next, in step S32, Rx1 sets the switching status to "COMPLETE" and displays it on the display.

FIG. 17 is a flowchart illustrating a problem analysis flow of the designated-failure detection. Here, a flow for detecting a failure when the processing illustrated in FIG. 16 is not performed normally will be described by way of example. First, in step S40, transmission and reception of the end device (AV device 100) to be switched are checked. At this time, the check is performed by acquiring information from an API or by a selection on a monitoring user interface.

In the next step S42, a switching instruction is issued. Here, it is checked whether a switching request message is transmitted from the system controller 400 to the receiving AV device 100 (Rx1). Specifically, a control route is acquired, the unicast flow from the system controller 400 to the receiving Rx1 is monitored at each link to check for any link down.

In the next step S44, it is checked whether an IGMP packet (join request) is issued from the receiving Rx1. Here, the IGMP flow from Rx1 to the IP switch is monitored. In the next step S46, it is checked whether the IGMP packet (join request) has arrived at the SDN controller 500. If the IGMP packet has arrived, route information to be transmitted is acquired.

In the next step S48, the flow in the AV route from transmission to reception is monitored. Here, the monitoring is focused on whether the traffic is in connection and whether there is a problem with the average bandwidth.

In the next step S50, it is checked whether or not the reception switching status in Rx1 described in step S32 of FIG. 16 is "COMPLETE". In the next step S52, it is checked whether or not a problem has occurred on the receiving side. In the next step S54, it is checked by analyzing the error log whether or not a problem has occurred in the server, the display, the transmitting AV device 100 (Tx1), and the receiving AV device 100 (Rx1). After step S54, the processing ends.

If a problem has occurred in each of steps S40 to S46, processing of notifying of the problem is performed. The processing of steps S40 to S46 corresponds to the detection of control-based failure. The order of the failure detection is not specified as described above, but may be determined to improve efficiency to be a specific failure detection order, such as detection in the order that is easy to detect (with light processing load) or detection in the order of descending probabilities of problem occurrence.

Next, an example using OpenFlow will be described as a technique for checking whether the switching request message is transmitted to the receiving device (Rx1). In this case, the failure detection is performed according to the following flow.

Step S60: Acquire the route information of a control message from the SDN controller 500.

Step S62: Acquire flow statistical information from the related switch of the IP switch 200.

Step S64: Since it may not be possible to grasp all the routes from a flow for control, the network system analyzer 600 adds a flow for monitoring the insufficient flow.

Step S66: Acquire the statistical information of the added flow.

Step S68: Check whether the flow is flowing clue to the change in the number of bytes of the flow in the route for control.

Step S70: Notify of a part where the flow is not flowing in the route for control, if any.

Figure 18:
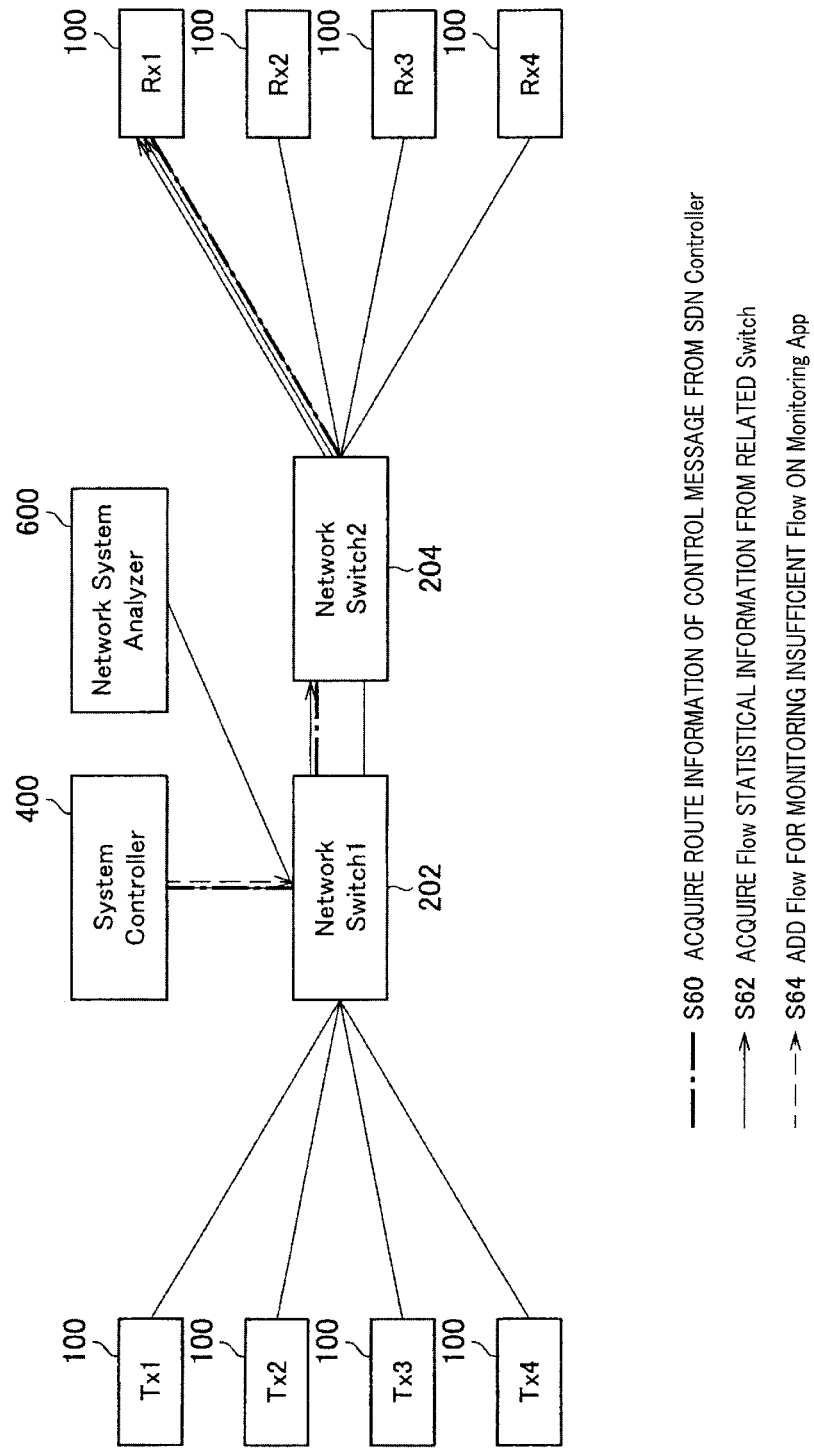
FIG. 18 is a schematic diagram for explaining a flow of a failure detection.

FIG. 18 is a schematic diagram for explaining the flow of the above technique, and illustrates the processing of each of the above steps in association with the arrows in the drawing. The designated-failure detection unit 650 acquires the route information of the flows indicated by dashed-dotted lines (step S60), and acquires the flow statistical information from the related switch (step S62). Then, in step S64, a flow is added between the system controller 400 and the IP switch 202 as the arrow indicated by a broken line.

Figure 19:
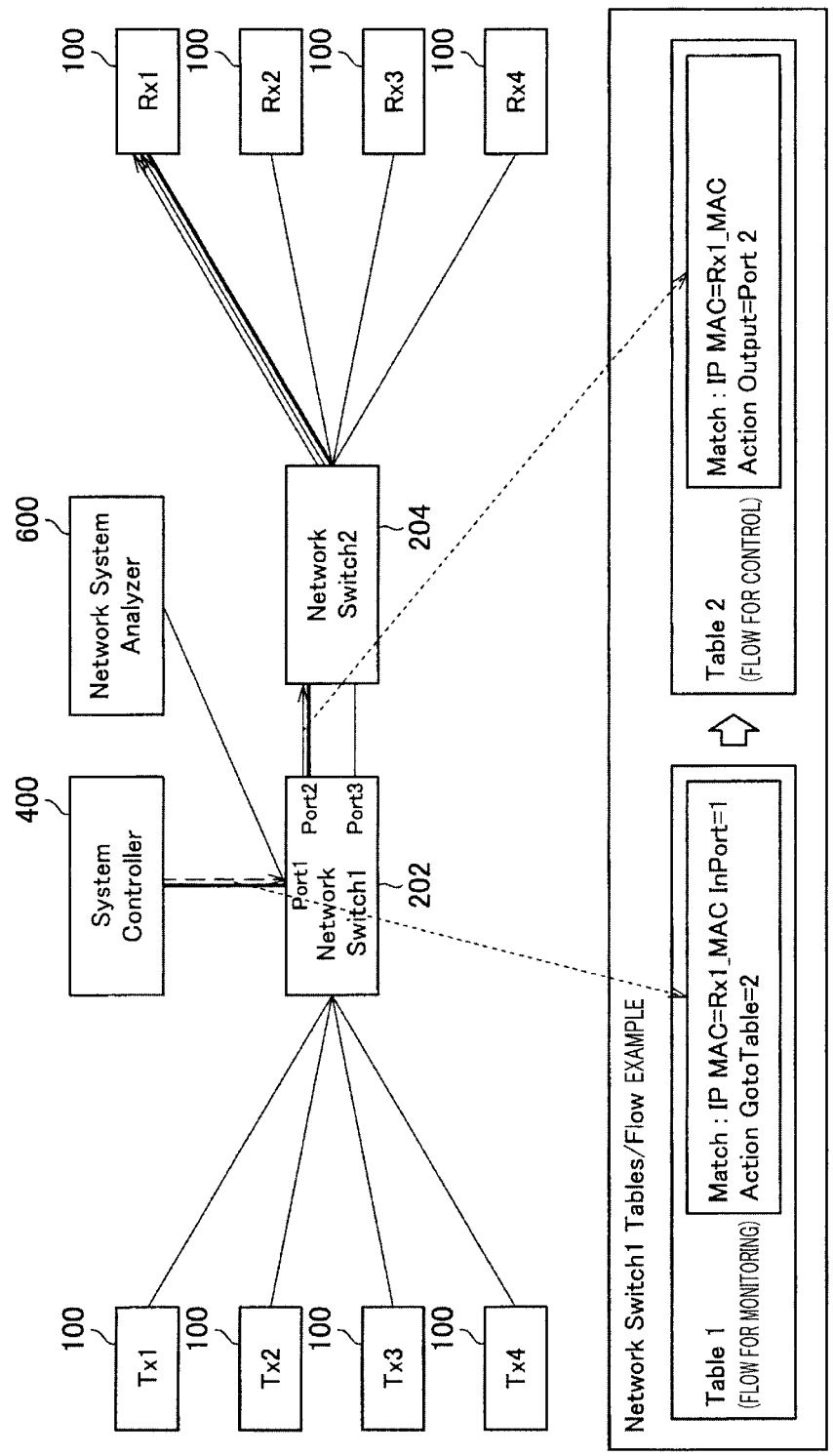
FIG. 19 is a schematic diagram illustrating a method of adding a flow for monitoring.

FIG. 19 is a schematic diagram illustrating a method of adding a flow for monitoring in step S64. If there is a flow that cannot be monitored on the network, the designated-failure detection unit 650 of the network system analyzer 600 adds a flow for monitoring by the method illustrated in FIG. 19. Note that the system failure automatic detection unit 640 can also add the flow for monitoring by the same method. Tables for control and for monitoring are separately set, the monitoring flow is defined in the first table, and is transferred to the table for control by "Goto Table".

6. Application Example

The techniques according to the present disclosure can be applied to various products. For example, the techniques according to the present disclosure may be applied to operating room systems.

Figure 20:
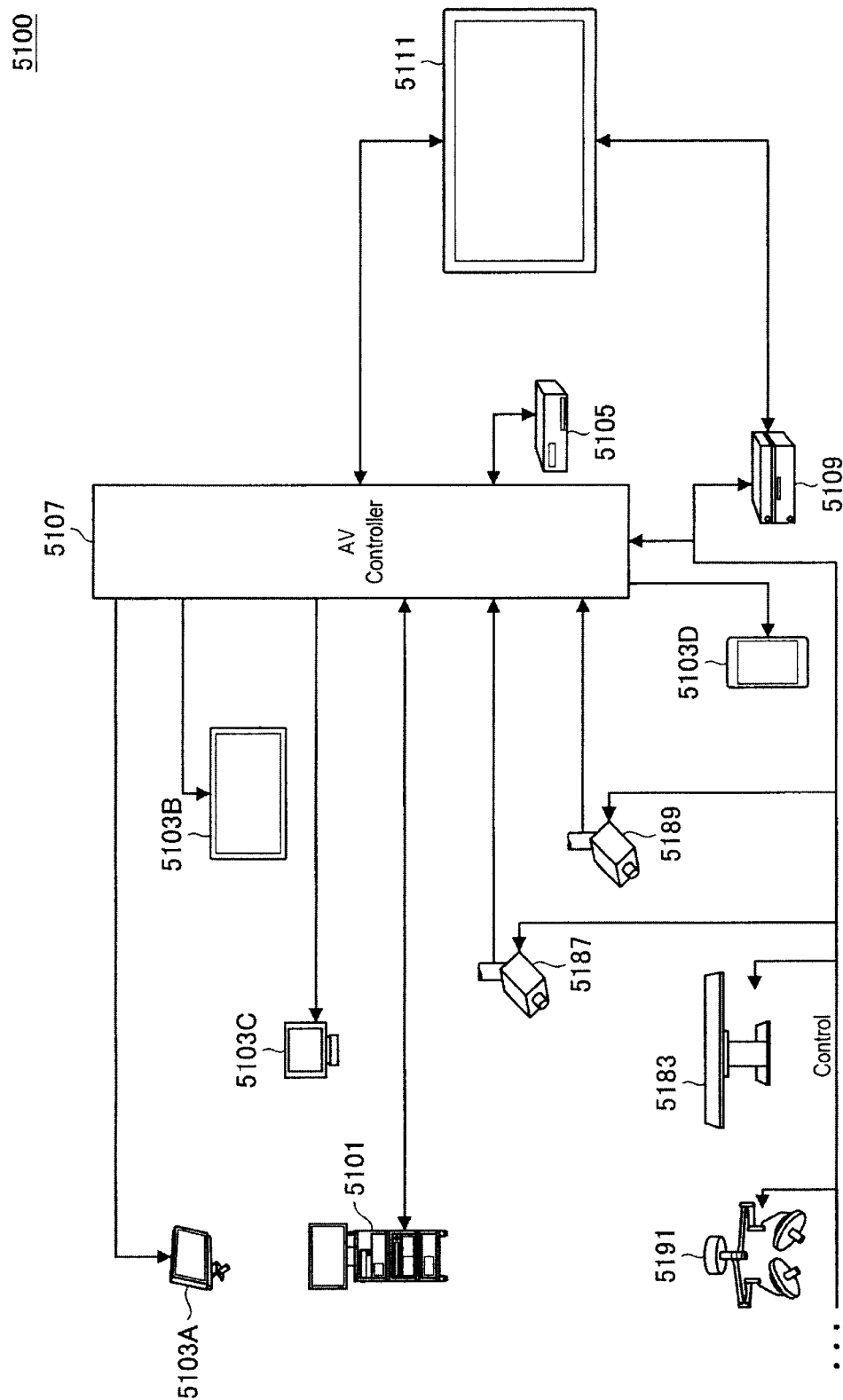
FIG. 20 is a diagram schematically illustrating the entire configuration of an operating room system.

FIG. 20 is a diagram schematically illustrating the overall configuration of an operating room system 5100 to which the techniques according to the present disclosure can be applied. Referring to FIG. 20, the operating room system 5100 has a configuration in which multiple devices installed in an operating room are connected to each other in a cooperative manner via an audiovisual (AV) controller 5107 and an operating room control device 5109.

Various devices can be installed in the operating room. FIG. 20 illustrates, as an example, a set of various devices 5101 for endoscopic surgery, a ceiling camera 5187 provided on the ceiling of the operating room to capture an image of an operator's hand, a surgical field camera 5189 provided on the ceiling of the operating room to capture an image of the state of the entire operating room, a plurality of display devices 5103A to 5103D, a recorder 5105, a patient bed 5183, and a lighting 5191.

Here, among these devices, the set of devices 5101 belongs to an endoscopic surgery system 5113 described below, and includes an endoscope, a display device that displays an image captured by the endoscope, and the like. Each of the devices belonging to the endoscopic surgery system 5113 is also referred to as a medical device. On the other hand, the display devices 5103A to 5103D, the recorder 5105, the patient bed 5183, and the lighting 5191 are devices provided separately from the endoscopic surgery system 5113, for example, in the operating room. Each of these devices that does not belong to the endoscopic surgery system 5113 is also referred to as a non-medical device. The audiovisual controller 5107 and/or the operating room control device 5109 controls the operations of these medical devices and non-medical devices in cooperation with each other.

The audiovisual controller 5107 generally controls processing related to image display in the medical devices and the non-medical devices. Specifically, among the devices included in the operating room system 5100, the set of devices 5101, the ceiling camera 5187, and the surgical field camera 5189 may each be a device (hereinafter, also referred to as a source device) having a function of outputting information to be displayed during the surgical operation (hereinafter, also referred to as display information). Further, the display devices 5103A to 5103D may each be a device for outputting the display information (hereinafter, also referred to as a destination device). Further, the recorder 5105 may be a device serving as both the source device and the destination device. The audiovisual controller 5107 has functions of controlling the operation of the source device and the destination device, acquiring the display information from the source device, and transmitting the display information to the destination device for display or recording. Note that the display information includes various images captured during the surgical operation, various information related to the surgical operation (e.g., physical information of the patient, past test results, information on the surgical procedure, etc.), and the like.

Specifically, the set of devices 5101 may transmit, as display information, information about an image of the surgical site in a body cavity of the patient captured by the endoscope to the audiovisual controller 5107. Further, the ceiling camera 5187 may transmit, as display information, information about an image around the operator's hand captured by the ceiling camera 5187. Further, the surgical field camera 5189 may transmit, as display information, information about an image showing the state of the entire operating room captured by the surgical field camera 5189. Note that in a case where the operating room system 5100 includes another device having an image capturing function, the audiovisual controller 5107 acquires, as display information, information about an image captured by the other device from the other device.

Alternatively, for example, the recorder 5105 records information about these images captured in the past by the audiovisual controller 5107. The audiovisual controller 5107 can acquire information about the images captured in the past from the recorder 5105 as display information. Note that the recorder 5105 may record various information about the surgical operation in advance.

The audiovisual controller 5107 causes at least one of the display devices 5103A to 5103D, which are the destination devices, to display the acquired display information (i.e., an image captured during the surgical operation and/or various information related to the surgical operation). In the illustrated example, the display device 5103A is a display device suspended from the ceiling of the operating room, the display device 5103B is a display device installed on a wall surface of the operating room, the display device 5103C is a display device installed on a desk in the operating room, and the display device 5103D is a mobile device having a display function (e.g., a tablet PC (Personal Computer)).

Further, although not illustrated in FIG. 20, the operating room system 5100 may include a device outside the operating room. The device outside the operating room may be, for example, a server connected to a network constructed inside or outside the hospital, a PC used by medical staff, a projector installed in a conference room of the hospital, or the like. In a case where such an external device is located outside the hospital, the audiovisual controller 5107 can also display the display information on a display device of another hospital via a video conferencing system or the like for telemedicine.

The operating room control device 5109 generally controls processing other than the processing related to image display in the non-medical devices. For example, the operating room control device 5109 controls the drive of the patient bed 5183, the ceiling camera 5187, the surgical field camera 5189, and the lighting 5191.

The operating room system 5100 is provided with an integrated operation panel 5111, and a user can give, via the integrated operation panel 5111, an instruction regarding image display to the audiovisual controller 5107, and an instruction regarding the operation of the non-medical devices to the operating room control device 5109. The integrated operation panel 5111 is configured in which a touch panel is provided on the display surface of the display device.

Figure 21:
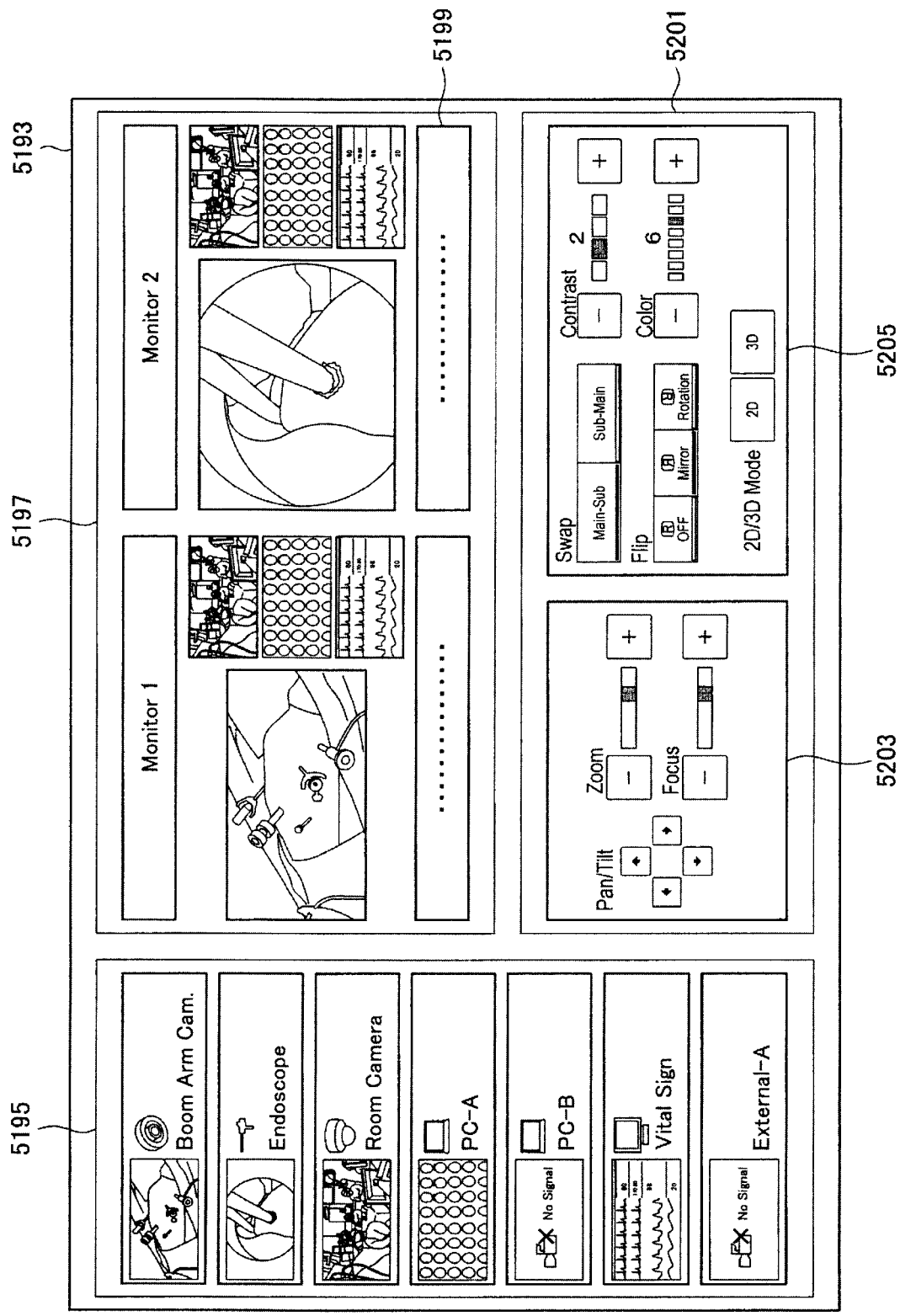
FIG. 21 is a diagram illustrating a display example of an operation screen in an integrated operation panel.

FIG. 21 is a diagram illustrating a display example of an operation screen in the integrated operation panel 5111. FIG. 21 illustrates, as an example, an operation screen for a case where the operating room system 5100 is provided with two display devices as the destination devices. Referring to FIG. 21, a source selection area 5195, a preview area 5197, and a control area 5201 are arranged on an operation screen 5193.

In the source selection area 5195, a source device provided in the operating room system 5100 and a thumbnail screen showing the display information possessed by the source device are displayed so that they are associated with each other. The user can select display information to be displayed on the display device from any of the source devices displayed in the source selection area 5195.

In the preview area 5197, a preview of screens displayed on two display devices (Monitor 1 and Monitor 2), which are the output destination devices, is displayed. In the illustrated example, four images are displayed in a PinP manner for one display device. The four images correspond to the display information transmitted from the source device selected in the source selection area 5195. Of the four images, one is displayed relatively large as a main image and the remaining three images are displayed relatively small as sub-images. The user can switch one sub image to the main image by appropriately selecting a place in the area in which the four images are displayed. Further, a status display area 5199 is arranged at the bottom of the area in which the four images are displayed so that the status related to the surgical operation (e.g., an elapsed time of the surgical operation, the physical information of the patient, etc.) can be appropriately displayed in the area.

A source operation area 5203 in which a GUI (Graphical User Interface) component for performing an operation on the source device is displayed and a destination operation area 5205 in which a GUI component for performing an operation on the destination device is displayed are arranged in the control area 5201. In the illustrated example, GUI components for performing various operations (pan, tilt, zoom) on the camera of the source device having an image capturing function are arranged in the source operation area 5203. The user can control the operation of the camera in the source device by appropriately selecting any of these GUI components. Note that although not illustrated, in a case where the source device selected in the source selection area 5195 is a recorder (i.e., in a case where an image recorded in the past on the recorder is displayed in the preview area 5197), GUI components for performing operations, such as play, stop, backward, and forward the image, may be arranged in the source operation area 5203.

Further, GUI components for performing various operations (swap, flip, adjust color, adjust contrast, switch between 2D display and 3D display) for display on the display device which is the destination device are arranged in the output destination operation area 5205. The user can control the display on the display device by appropriately selecting any of these GUI components.

Note that the operation screen displayed on the integrated operation panel 5111 is not limited to the illustrated example, and it may be possible for the user to perform an operational input on each device which is included in the operating room system 5100 and can be controlled by the audiovisual controller 5107 and the operating room control device 5109, through the integrated operation panel 5111.

Figure 22:
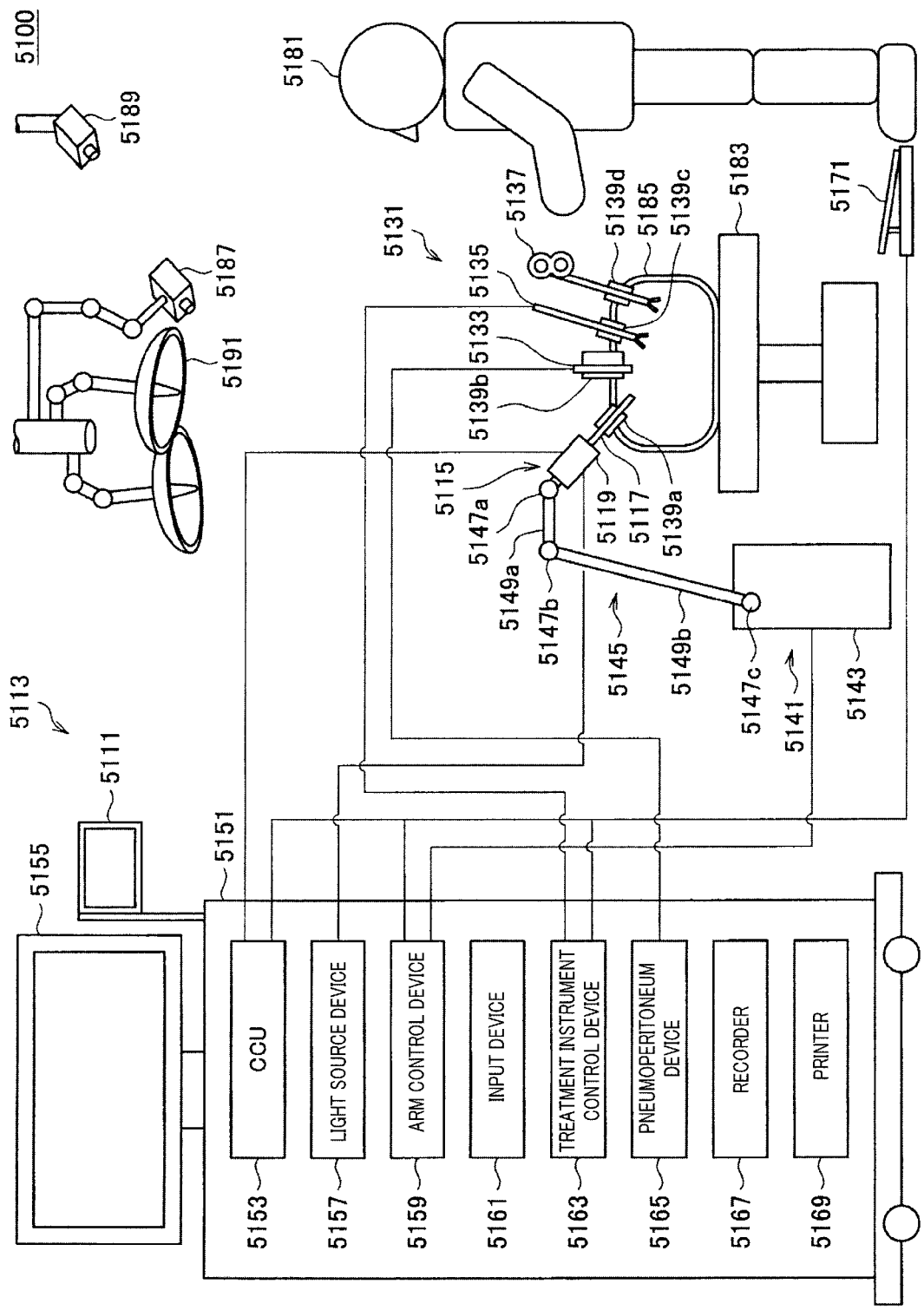
FIG. 22 is a diagram illustrating an example of the state of a surgical operation in which the operating room system is applied.

FIG. 22 is a diagram illustrating an example of the state of a surgical surgery to which the operating room system described above is applied. The ceiling camera 5187 and the surgical field camera 5189 are installed on the ceiling of the operating room, and can capture the states of the hands of a surgeon (doctor) 5181 who treats an affected part of a patient 5185 on the patient bed 5183 and the entire operating room. The ceiling camera 5187 and the surgical field camera 5189 may be provided with a magnification adjusting function, a focal length adjusting function, an image capturing direction adjusting function, and the like. The lighting 5191 is installed on the ceiling of the operating room and illuminates at least the hands of the surgeon 5181. The lighting 5191 may be capable of appropriately adjusting the amount of irradiation light, the wavelength (color) of the irradiation light, the irradiation direction of the light, and the like.

The endoscopic surgery system 5113, the patient bed 5183, the ceiling camera 5187, the surgical field camera 5189, and the lighting 5191 are connected to each other in a cooperative manner via the audiovisual controller 5107 and the operating room control device 5109 (both not illustrated in FIG. 22), as illustrated in FIG. 20. The integrated operation panel 5111 is provided in the operating room, so that the user can appropriately operate these devices located in the operating room through the integrated operation panel 5111, as described above.

The configuration of the endoscopic surgery system 5113 will be described in detail below. As illustrated in FIG. 22, the endoscopic surgery system 5113 includes an endoscope 5115, other surgical instruments 5131, a support arm device 5141 that supports the endoscope 5115, and a cart 5151 in which various devices for endoscopic surgery are housed.

In endoscopic surgery, instead of cutting and opening an abdominal wall, a plurality of tubular laparotomy instruments called trocars 5139a to 5139d puncture the abdominal wall. Then, from the trocars 5139a to 5139d, a lens barrel 5117 of the endoscope 5115 and the other surgical instruments 5131 are inserted into the body cavity of the patient 5185. In the illustrated example, as the other surgical instruments 5131, a pneumoperitoneum tube 5133, an energy treatment instrument 5135, and a forceps 5137 are inserted into the body cavity of the patient 5185. Further, the energy treatment instrument 5135 is a treatment instrument for cutting and peeling tissue, sealing a blood vessel, or the like by using a high-frequency current or ultrasonic vibration. However, the surgical instruments 5131 illustrated is only an example, and the surgical instruments 5131 may include various surgical instruments typically used in endoscopic surgery such as tweezers and a retractor.

An image of a surgical site in the body cavity of the patient 5185 captured by the endoscope 5115 is displayed on a display device 5155. While viewing the image of the surgical site displayed on the display device 5155 in real time, the surgeon 5181 uses the energy treatment instrument 5135 and the forceps 5137 to perform a treatment such as the excision of an affected area. Note that although not illustrated, the pneumoperitoneum tube 5133, the energy treatment instrument 5135, and the forceps 5137 are held by the surgeon 5181 or an assistant during the surgical operation.

(Support Arm Device)

The support arm device 5141 includes an arm portion 5145 extending from a base portion 5143. In the illustrated example, the arm portion 5145 is composed of joint portions 5147a, 5147b, and 5147c, and links 5149a and 5149b, and is driven by control from an arm control device 5159. The endoscope 5115 is supported by the arm portion 5145, and its position and posture are controlled. As a result, the stable position of the endoscope 5115 can be fixed.

(Endoscope)

The endoscope 5115 is configured to include the lens barrel 5117 in which a region having a predetermined length from its tip is inserted into the body cavity of the patient 5185, and a camera head 5119 connected to the base end of the lens barrel 5117. In the illustrated example, the endoscope 5115 is illustrated as being configured as a so-called rigid scope having a rigid lens barrel 5117. However, the endoscope 5115 may be configured as a so-called flexible scope having a flexible lens barrel 5117.

An opening in which an objective lens is fitted is provided at the tip of the lens barrel 5117. A light source device 5157 is connected to the endoscope 5115. The light generated by the light source device 5157 is guided to the tip of the lens barrel 5117 by a light guide extending inside the lens barrel, and irradiates the observation target in the body cavity of the patient 5185 via the objective lens. Note that the endoscope 5115 may be a direct endoscope, a perspective mirror, or a side endoscope.

An optical system and an imaging element are provided inside the camera head 5119, and the reflected light (observation light) from the observation target is condensed on the imaging element by the optical system. The observation light is photoelectrically converted by the imaging element, and an electric signal corresponding to the observation light, that is, an image signal corresponding to the observation image is generated. The image signal is transmitted as RAW data to a camera control unit (CCU) 5153. The camera head 5119 has a function of adjusting the magnification and the focal length by appropriately driving the optical system.

Note that the camera head 5119 may be provided with a plurality of imaging elements to support stereoscopic viewing (3D display) or the like. In this case, a plurality of relay optical systems are provided inside the lens barrel 5117 to guide the observation light to the respective imaging elements.

(Various devices housed in cart) The CCU 5153 is configured to include a CPU (Central Processing Unit), a GPU (Graphics Processing Unit), and the like, and generally controls the operations of the endoscope 5115 and the display device 5155. Specifically, the CCU 5153 performs, on the image signal received from the camera head 5119, various image processing for displaying an image based on the image signal, such as development processing (demosaic processing). The CCU 5153 provides the display device 5155 with the image signal subjected to the image processing. Further, the audiovisual controller 5107 illustrated in FIG. 20 is connected to the CCU 5153. The CCU 5153 also provides the audiovisual controller 5107 with the image signal subjected to the image processing. In addition, the CCU 5153 transmits a control signal to the camera head 5119 to control the drive of the camera head 5119. The control signal may include information about imaging conditions such as magnification and focal length. The information about imaging conditions may be input via an input device 5161 or may be input via the integrated operation panel 5111 described above.

The display device 5155 displays the image based on the image signal subjected to the image processing by the CCU 5153 under the control of the CCU 5153. If the endoscope 5115 supports high-resolution imaging such as 4K (3840 horizontal pixels×2160 vertical pixels) or 8K (7680 horizontal pixels×4320 vertical pixels), and/or supports 3D display, a display device capable of displaying such a high resolution and/or displaying in 3D can be used as the display device 5155. If it supports high-resolution imaging such as 4K or 8K, a display device having a size of 55 inches or more can be used to provide a more immersive feeling as the display device 5155. Further, a plurality of display devices 5155 having different resolutions and sizes may be provided depending on the application.

The light source device 5157 is configured to include a light source such as an LED (Light Emitting Diode), to supply irradiation light for capturing an image of the surgical site to the endoscope 5115.

The arm control device 5159 is configured to include a processor such as a CPU and operates according to a predetermined program to control the drive of the arm portion 5145 of the support arm device 5141 according to a predetermined control method.

The input device 5161 is an input interface to the endoscopic surgery system 5113. The user can input various information and input instructions to the endoscopic surgery system 5113 via the input device 5161. For example, the user inputs various information related to the surgical operation, such as physical information of the patient and information about a surgical form, via the input device 5161. Further, for example, the user inputs, via the input device 5161, an instruction to drive the arm portion 5145, an instruction to change the imaging conditions (type of irradiation light, magnification, focal length, etc.) of the endoscope 5115, an instruction to drive the energy treatment instrument 5135, and the like.

The type of the input device 5161 is not limited, and the input device 5161 may be various known input devices. As the input device 5161, for example, a mouse, a keyboard, a touch panel, a switch, a foot switch 5171 and/or a lever, and the like can be applied. In a case where a touch panel is used as the input device 5161, the touch panel may be provided on the display surface of the display device 5155.

Alternatively, the input device 5161 is a device worn by the user, such as a glasses-type wearable device or an HMD (Head Mounted Display), so that various inputs are made according to the user's gesture and line of sight detected by these devices. Further, the input device 5161 includes a camera capable of detecting the motion of the user, so that various inputs are made according to the user's gesture and line of sight detected from a video captured by the camera. Further, the input device 5161 includes a microphone capable of picking up the user's voice, so that various inputs are made by voice through the microphone. In this way, the input device 5161 is configured to be able to receive input of various information in a non-contact manner, so that it is possible for a user located in a clean area (e.g., the surgeon 5181) to operate a device located in a dirty area in a non-contact manner. In addition, since the user can operate the devices without taking his/her hand off the surgical instrument being held, the convenience of the user is improved.

A treatment instrument control device 5163 controls the drive of the energy treatment instrument 5135 for cauterizing, incising, sealing blood vessels, and the like. For the purpose of securing the field of view of the endoscope 5115 and securing the work space of the surgeon, a pneumoperitoneum device 5165 supplies gas to the body cavity of the patient 5185 via the pneumoperitoneum tube 5133 to expand the body cavity. A recorder 5167 is a device capable of recording various information related to the surgical operation. A printer 5169 is a device capable of printing various information related to the surgical operation in various formats such as text, image, and graph.

A configuration, particularly characteristic, of the endoscopic surgery system 5113 will be described below in more detail.

(Support Arm Device)

The support arm device 5141 includes the base portion 5143 that is a base, and the arm portion 5145 that extends from the base portion 5143. In the illustrated example, the arm portion 5145 is composed of the plurality of joint portions 5147a, 5147b, and 5147c and a plurality of links 5149a and 5149b connected by the joint portions 5147b. However, in FIG. 22, the configuration of the arm portion 5145 is simplified for simplicity. Actually, the shapes, numbers, and arrangements of the joint portions 5147a to 5147c and the links 5149a and 5149b, and the direction of the rotation axis of the joint portions 5147a to 5147c may be set as appropriate so that the arm portion 5145 has a desired degree of freedom. For example, the arm portion 5145 may be preferably configured to have at least 6 degrees of freedom. As a result, the endoscope 5115 can be freely moved within the movable range of the arm portion 5145, so that it is possible to insert the lens barrel 5117 of the endoscope 5115 into the body cavity of the patient 5185 from a desired direction.

Actuators are provided in the joint portions 5147a to 5147c, and the joint portions 5147a to 5147c are configured to be rotatable around the respective predetermined rotation axes by driving the actuators. By controlling the drive of the actuators by the arm control device 5159, the rotation angles of the joint portions 5147a to 5147c are controlled, and the drive of the arm portion 5145 is controlled accordingly. This makes it possible to control the position and posture of the endoscope 5115. At this time, the arm control device 5159 can control the drive of the arm portion 5145 by various known control methods such as force control or position control.

For example, when the surgeon 5181 appropriately performs an operational input via an input device 5161 (including the foot switch 5171), the arm control device 5159 may appropriately control the drive of the arm portion 5145 in response to the operational input, so that the position and posture of the endoscope 5115 is controlled. By this control, the endoscope 5115 at the tip of the arm portion 5145 can be moved from one position to another position, and then fixedly supported at the moved position. Note that the arm portion 5145 may be operated by a so-called master-slave method. In this case, the arm portion 5145 may be remotely controlled by the user via the input device 5161 installed at a location away from the operating room.

Further, in a case where the force control is applied, the arm control device 5159 may perform a so-called power assist control in which the arm portion 5145 receives an external force from the user and the actuators of the joint portions 5147a to 5147c are driven so that the arm portion 5145 moves smoothly according to the external force. With this makes it possible to move the arm portion 5145 with a relatively light force when the user moves the arm portion 5145 while directly touching the arm portion 5145. Accordingly, it is possible to move the endoscope 5115 more intuitively and with a simpler operation, and thus to improve the convenience of the user.

Here, conventionally in endoscopic surgery, the endoscope 5115 is supported by a doctor called a scopist. By contrast, using the support arm device 5141 makes it possible to fix the position of the endoscope 5115 more reliably without human intervention, so that an image of the surgical site can be stably obtained and thus the surgical operation can be performed smoothly.

Note that the arm control device 5159 does not necessarily have to be housed in the cart 5151. Further, the arm control device 5159 does not necessarily have to be one device. For example, the arm control device 5159 may be provided at each of the joint portion 5147a to 5147c of the arm portion 5145 of the support arm device 5141, and the plurality of arm control devices 5159 cooperate with each other to make the drive control of the arm portion 5145.

(Light Source Device)

The light source device 5157 supplies irradiation light for capturing an image of the surgical site to the endoscope 5115. The light source device 5157 is configured to include, for example, an LED, a laser light source, or a white light source composed of a combination thereof. Here, in a case where a white light source is composed of a combination of RGB laser light sources, the output intensity and output timing of each color (each wavelength) can be controlled with high accuracy, and thus, the white balances of a captured image can be adjusted in the light source device 5157. Further, in this case, when the observation target is irradiated with the laser light from each of the RGB laser light sources in a time-division manner and the drive of the imaging element of the camera head 5119 is controlled in synchronization with the irradiation timing, it is also possible to capture images corresponding to RGB in a time-division manner. According to this method, a color image can be obtained without a color filter provided on the imaging element.

Further, the drive of the light source device 5157 may be controlled so as to change the intensity of the output light at predetermined time intervals. The drive of the imaging element of the camera head 5119 is controlled in synchronization with the timing of the change in the light intensity to acquire images in a time-divided manner and then the images are synthesized, so that it is possible to generate a high dynamic range image without so-called crushed blacks and clipped whites.

Further, the light source device 5157 may be configured to be able to supply light in a predetermined wavelength band corresponding to special light observation. In the special light observation, for example, a so-called narrow band light observation (narrow band imaging) is performed in which the wavelength dependence of light absorption in body tissue is utilized to irradiate a predetermined tissue, such as a blood vessel in the surface layer of a mucous membrane, with light with a narrower band than the irradiation light (i.e., white light) for normal observation, and thus to capture an image of the predetermined tissue with high contrast. Alternatively, in the special light observation, fluorescence observation may be performed in which an image is obtained by the fluorescence generated by irradiating with excitation light. In the fluorescence observation, a body tissue may be irradiated with excitation light to observe the fluorescence from the body tissue (autofluorescence observation), or a reagent such as indocyanine green (ICG) may be locally injected into a body tissue and the body tissue may also be irradiated with excitation light corresponding to the fluorescence wavelength of the reagent to obtain a fluorescence image. The light source device 5157 may be configured to be able to supply narrow band light and/or excitation light corresponding to such special light observation.

(Camera Head and CCU)

Figure 23:
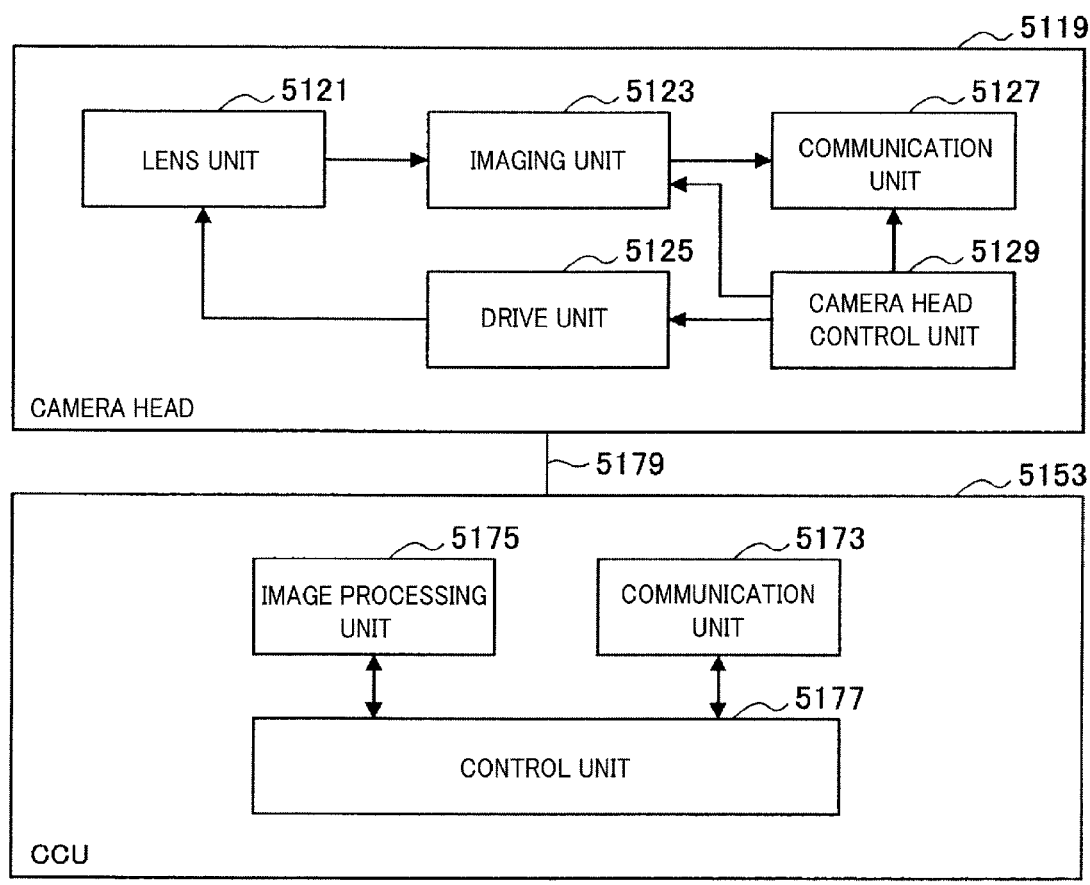
FIG. 23 is a block diagram illustrating an example of the functional configuration of a camera head and a CCU which are illustrated in FIG. 22.

The functions of the camera head 5119 and the CCU 5153 of the endoscope 5115 will be described in more detail with reference to FIG. 23. FIG. 23 is a block diagram illustrating an example of the functional configuration of the camera head 5119 and the CCU 5153 which are illustrated in FIG. 22.

Referring to FIG. 23, the camera head 5119 includes a lens unit 5121, an imaging unit 5123, a drive unit 5125, a communication unit 5127, and a camera head control unit 5129, which correspond to its own functions. Further, the CCU 5153 includes a communication unit 5173, an image processing unit 5175, and a control unit 5177, which correspond to its own functions. The camera head 5119 and the CCU 5153 are bidirectionally communicatively connected by a transmission cable 5179.

First, the functional configuration of the camera head 5119 will be described. The lens unit 5121 is an optical system provided at a connection portion with the lens barrel 5117. The observation light taken in from the tip of the lens barrel 5117 is guided to the camera head 5119 and enters the lens unit 5121. The lens unit 5121 is composed of a combination of a plurality of lenses including a zoom lens and a focus lens. The optical characteristics of the lens unit 5121 are adjusted so as to condense the observation light on the light receiving surface of the imaging element of the imaging unit 5123. Further, the zoom lens and the focus lens are arranged so that their positions on the optical axis can be moved in order to adjust the magnification and the focus of a captured image.

The imaging unit 5123 is configured to include an imaging element and is arranged after the lens unit 5121. The observation light that has passed through the lens unit 5121 is condensed on the light receiving surface of the imaging element, and an image signal corresponding to an observation image is generated by photoelectric conversion. The image signal generated by the imaging unit 5123 is provided to the communication unit 5127.

As the imaging element of the imaging unit 5123, for example, a CMOS (Complementary Metal Oxide Semiconductor) type image sensor having a Bayer array and capable of color photographing is used. Note that as the imaging element, for example, an imaging element capable of capturing a high-resolution image of 4K or higher may be used. Obtaining the image of the surgical site in high resolution makes it possible for the surgeon 5181 to grasp the state of the surgical site in more detail, and to proceed with the surgical operation more smoothly.

Further, the imaging element of the imaging unit 5123 are configured to include a pair of imaging elements for acquiring image signals for the right eye and the left eye corresponding to 3D display. The 3D display enables the surgeon 5181 to more accurately grasp the depth of a living tissue in the surgical site. Now that in a case where the imaging unit 5123 is configured as a multi-plane type, a plurality of lens units 5121 are also provided corresponding to the respective imaging elements.

Further, the imaging unit 5123 does not necessarily have to be provided on the camera head 5119. For example, the imaging unit 5123 may be provided inside the lens barrel 5117, immediately after the objective lens.

The drive unit 5125 is configured to include an actuator, and moves the zoom lens and the focus lens of the lens unit 5121 by a predetermined distance along the optical axis under the control of the camera head control unit 5129. As a result, the magnification and focus of an image captured by the imaging unit 5123 can be adjusted as appropriate.

The communication unit 5127 is configured to include a communication device for transmitting and receiving various information to and from the CCU 5153. The communication unit 5127 transmits the image signal obtained from the imaging unit 5123 as RAW data to the CCU 5153 via the transmission cable 5179. At this time, in order to display the captured image of the surgical site with low latency, it is preferable that the image signal is transmitted by optical communication. This is because since the surgeon 5181 performs the surgical operation while observing the condition of the affected part with the captured image during the surgical operation, safer and more reliable surgery requires the moving image of the surgical site to be displayed in real time as much as possible. In a case where optical communication is performed, the communication unit 5127 is provided with a photoelectric conversion module that converts an electric signal into an optical signal. The image signal is converted into an optical signal by the photoelectric conversion module and then transmitted to the CCU 5153 via the transmission cable 5179.

Further, the communication unit 5127 receives a control signal for controlling the drive of the camera head 5119 from the CCU 5153. The control signal includes, for example, information about the imaging conditions, such as information for specifying the frame rate of the captured image, information for specifying the exposure value at the time of image capturing, and/or information for specifying the magnification and focus of the captured image. The communication unit 5127 provides the received control signal to the camera head control unit 5129. Note that the control signal from CCU 5153 may also be transmitted by optical communication. In this case, the communication unit 5127 is provided with a photoelectric conversion module that converts an optical signal into an electric signal, and the control signal is converted into an electric signal by the photoelectric conversion module and then provided to the camera head control unit 5129.

Now that the imaging conditions such as the frame rate, exposure value, magnification, and focus are automatically set by the control unit 5177 of the CCU 5153 based on the acquired image signal. In other words, the endoscope 5115 has the so-called AE (Auto Exposure) function, AF (Auto Focus) function, and AWB (Auto White Balance) function.

The camera head control unit 5129 controls the drive of the camera head 5119 based on the control signal from the CCU 5153 received via the communication unit 5127. For example, the camera head control unit 5129 controls the drive of the imaging element of the imaging unit 5123 based on the information for specifying the frame rate of the captured image and/or the information for specifying the exposure at the time of image capturing. Further, for example, the camera head control unit 5129 appropriately moves the zoom lens and the focus lens of the lens unit 5121 via the drive unit 5125 based on the information for specifying the magnification and the focus of the captured image. The camera head control unit 5129 may further have a function of storing information for identifying the lens barrel 5117 and the camera head 5119.

Note that arranging the lens unit 5121, the imaging unit 5123, and the like in a sealed structure having high airtightness and waterproofness makes it possible to make the camera head 5119 resistant to autoclave sterilization.

Next, the functional configuration of the CCU 5153 will be described. The communication unit 5173 is configured to include a communication device for transmitting and receiving various information to and from the camera head 5119. The communication unit 5173 receives an image signal transmitted from the camera head 5119 via the transmission cable 5179. At this time, as described above, the image signal may be suitably transmitted by optical communication. In this case, the communication unit 5173 is provided with a photoelectric conversion module that converts an optical signal into an electric signal in order to support optical communication. The communication unit 5173 provides the image processing unit 5175 with an image signal converted into an electric signal.

Further, the communication unit 5173 transmits a control signal for controlling the drive of the camera head 5119 to the camera head 5119. The control signal may also be transmitted by optical communication.

The image processing unit 5175 performs various image processing on the image signal which is the RAW data transmitted from the camera head 5119. The image processing includes various known signal processing such as development processing, high image quality processing (band enhancement processing, super-resolution processing, NR (Noise reduction) processing, and/or camera shake correction processing, etc.), and/or enlargement processing (electronic zoom processing), for example. The image processing unit 5175 also performs detection processing on the image signal for performing AE, AF, and AWB.

The image processing unit 5175 is configured to include a processor such as a CPU or GPU so that the processor can operate in accordance with a predetermined program to perform the above-mentioned image processing and detection processing. Note that in a case where the image processing unit 5175 is configured to include a plurality of GPUs, the image processing unit 5175 appropriately divides the information related to the image signal to perform image processing in parallel by the plurality of GPUs.

The control unit 5177 performs various controls related to image capturing of the surgical site with the endoscope 5115 and display of the captured image. For example, the control unit 5177 generates a control signal for controlling the drive of the camera head 5119. At this time, if an imaging condition has been input by the user, the control unit 5177 generates the control signal based on the input from the user. Alternatively, in a case where the endoscope 5115 has the AE function, the AF function, and the AWB function, the control unit 5177 appropriately calculates an optimum exposure value, a focal length, and a white balance depending on the result of the detection processing from the image processing unit 5175 to generate the control signal.

Further, the control unit 5177 causes the display device 5155 to display the image of the surgical unit based on the image signal subjected to the image processing by the image processing unit 5175. At this time, the control unit 5177 recognizes various objects in the surgical site image by using various image recognition techniques. For example, the control unit 5177 detects the shape and color of the edge of an object included in the surgical site image to recognize surgical instruments such as forceps, a specific biological part, bleeding, mist when using the energy treatment instrument 5135, and the like. When the control unit 5177 causes the display device 5155 to display the image of the surgical site, the control unit 5177 uses the recognition result to superimpose various surgical support information on the image of the surgical site. Superimposing the surgical support information and presenting it to the surgeon 5181 makes it possible to proceed with the surgical operation more safely and surely.

The transmission cable 5179 for connecting the camera head 5119 and the CCU 5153 is an electric signal cable that supports electric signal communication, an optical fiber that supports optical communication, or a composite cable thereof.

Here, in the illustrated example, the communication is performed by wire using the transmission cable 5179. However, the communication between the camera head 5119 and the CCU 5153 may be performed wirelessly. In a case where the communication between the two is performed wirelessly, it is not necessary to lay the transmission cable 5179 in the operating room, so that the situation where the transmission cable 5179 hinders the movement of medical staff in the operating room can be solved.

The example of the operating room system 5100 to which the techniques according to the present disclosure can be applied has been described above. Note that although the case where the medical system to which the operating room system 5100 is applied is the endoscopic surgery system 5113 has been described here by way of example, the configuration of the operating room system 5100 is not limited to such an example. For example, the operating room system 5100 may be applied to an examination flexible endoscopic system or a microsurgery system instead of the endoscopic surgery system 5113.

The techniques according to the present disclosure can be suitably applied to the network of the operating room system 5100 among the configurations described above. Applying the techniques according to the present disclosure to the operating room system 5100 makes it possible to construct a network system that efficiently connects the respective devices at a low cost.

Although the preferred embodiments of the present disclosure have been described in detail above with reference to the accompanying drawings, the technical scope of the present disclosure is not limited to such examples. It should be understood that it is obvious for a person having ordinary skill in the art of the present disclosure to conceive of various changes or modifications within the scope of the technical ideas set forth in the claims, and such changes or modifications also fall within the technical scope of the present disclosure.

Further, the advantageous effects described herein are merely explanatory or exemplary and are not limited. In other words, the techniques according to the present disclosure may exhibit other advantageous effects apparent to those skilled in the art from the description herein, in addition to or in place of the above advantageous effects.

Note that the following configurations also fall within the technical scope of the present disclosure.

(1)
A network monitoring system including:
an IP network monitoring unit that monitors an IP network to which an IP device is connected; and
a non-IP device monitoring unit that monitors a non-IP device.

(2)
The network monitoring system according to (1), wherein the IP network monitoring unit includes an IP device monitoring unit that monitors the IP device, and an IP switch monitoring unit that monitors an IP switch of the IP network.

(3)
The network monitoring system according to (1) or (2), wherein the IP network monitoring unit extracts a failure that has occurred in the IP network according to a pre-classified primary isolation cause, and extracts a root cause of the failure based on the extracted primary isolation cause.

(4)
The network monitoring system according to (3), wherein the IP network monitoring unit extracts, as the primary isolation cause, at least one of a failure of video information in the IP network, a failure of control information in the IP network, and a failure of synchronization information of the IP device.

(5)
The network monitoring system according to (3) or (4), wherein the IP network monitoring unit extracts, as the root cause, at least one of a failure of a cable provided in the IP network, a failure of an IP switch in the IP network, and a failure of the IP device.

(6)
The network monitoring system according to any one of (3) to (5), wherein the IP network monitoring unit extracts a solution to the failure that has occurred in the IP network by performing a detection for the extracted root cause.

(7)
The network monitoring system according to any one of (1) to (6), wherein the IP network monitoring unit monitors the IP network by visualizing a flow of the IP network on a per-flow basis.

(8)
The network monitoring system according to (7), wherein the IP network monitoring unit specifies the flow based on at least one of information collected from a system controller, information set by a user, and information collected from an application for specifying the flow.

(9)
The network monitoring system according to (8), wherein the IP network monitoring unit acquires and visualizes, for the specified flow, statistical information of the flow by an SDN function capable of acquiring the statistical information of the flow or a function of performing detailed analysis of packets obtained by a packet capture device.

(10)
The network monitoring system according to any one of (1) to (9), wherein the non-IP device monitoring unit extracts a failure that has occurred in the non-IP device according to a pre-classified primary isolation cause, and extracts a root cause of the failure based on the extracted primary isolation cause.

(11)
The network monitoring system according to (10), wherein the non-IP device monitoring unit extracts a solution to the failure that has occurred in the non-IP device by performing a detection for the extracted root cause.

(12)
The network monitoring system according to any one of (1) to (11), further including:
a system failure automatic detection unit that constantly detects system failures in the IP network; and
a designated-failure detection unit that designates an operation of a specific IP device in the IP network to detect a failure.

(13)
The network monitoring system according to (12), wherein the system failure automatic detection unit detects at least one of a failure related to a connection port in the IP network, a failure related to a network cable, a failure related to an IP switch in the IP network, a failure related to duplicate IP addresses, a failure related to bandwidth, and a failure related to unknown traffic.

(14)
The network monitoring system according to (12) or (13), wherein the designated-failure detection unit adds a flow for monitoring when there is a flow that cannot be monitored in the IP network.

(15)
The network monitoring system according to (14), wherein the designated-failure detection unit designates the operation by designating from a UI of a failure analysis function, notifying with an API call from a system controller, or identifying by performing analysis using the failure analysis function, and collates whether or not the designated operation is performed with the IP device and the IP network, to detect the failure.

(16)
The network monitoring system according to (15), wherein the detection of the failure based on the designated operation is performed by the IP network monitoring unit and the non-IP device monitoring unit.

(17)
The network monitoring system according to (13), wherein the system failure automatic detection unit constantly monitors an ARP and an ARP reply and holds a list of IP addresses/MACs in use, and the system failure automatic detection unit detects, when an IP address in use is in use for another device, a failure related to the duplicate IP addresses.

(18)
A network monitoring method including:
monitoring an IP network to which an IP device is connected; and
monitoring a non-IP device.

(19)
A network monitoring method for a transmission system in which AV signals are converted into IP packets, the network monitoring method including:
monitoring an IP network to which an IP device is connected; and
monitoring a non-IP device.

(20)
A program for causing a computer to function as:
means for monitoring an IP network to which an IP device is connected; and
means for monitoring a non-IP device.

REFERENCE SIGNS LIST

100 AV device
200 IP switch
600 Network system analyzer
610 IP device monitoring unit
620 SDN switch monitoring unit
630 Non-IP device monitoring unit
640 System failure automatic detection unit
650 Designated-failure detection unit

The invention claimed is:

1. A network monitoring system, comprising:
Internet Protocol (IP) network monitoring circuitry configured to monitor an IP network to which a plurality of IP devices is connected, the plurality of IP devices in the IP network being configured to communicate via the IP protocol, wherein the IP network monitoring circuitry is further configured to extract a first failure that has occurred in the IP network according to a first pre-classified primary isolation cause, and extract a root cause of the first failure based on the first primary isolation cause; and
non-IP device monitoring circuitry configured to monitor a non-IP device using particular data of the non-IP device received via the IP network and the IP network monitoring circuitry, wherein the non-IP device is not configured to communicate via the IP protocol with any IP device connected to the IP network, and the non-IP device monitoring circuitry is further configured to extract, using the received particular data of the non-IP device, a second failure that has occurred in the non-IP device according to a second pre-classified primary isolation cause, and extract a root cause of the second failure based on the second primary isolation cause.

2. The network monitoring system according to claim 1, wherein the IP network monitoring circuitry includes IP device monitoring circuitry configured to monitor an IP device in the IP network, and IP switch monitoring circuitry configured to monitor a software defined network (SDN) IP switch of the IP network.

3. The network monitoring system according to claim 1, wherein the IP network monitoring circuitry is further configured to extract, as the first primary isolation cause, at least one of a failure of video information in the IP network, a failure of control information in the IP network, and a failure of synchronization information of an IP device in the IP network.

4. The network monitoring system according to claim 1, wherein the IP network monitoring circuitry is further configured to extract, as the root cause of the first failure, at least one of a failure of a cable provided in the IP network, a failure of an IP switch in the IP network, and a failure of an IP device in the IP network.

5. The network monitoring system according to claim 1, wherein the IP network monitoring circuitry is further configured to extract a solution to the first failure that has occurred in the IP network by performing a detection for the extracted root cause of the first failure.

6. The network monitoring system according to claim 1, wherein the IP network monitoring circuitry is further configured to monitor the IP network by visualizing a flow of the IP network on a per-flow basis.

7. The network monitoring system according to claim 6, wherein the IP network monitoring circuitry is further configured to determine the flow based on at least one of information collected from a system controller, information set by a user, and information collected from an application for specifying the flow.

8. The network monitoring system according to claim 7, wherein the IP network monitoring circuitry is further configured to acquire and visualize, for the determined flow, statistical information of the flow by an SDN function configured to acquire the statistical information of the flow or a function of performing detailed analysis of packets obtained by a packet capture device.

9. The network monitoring system according to claim 1, wherein the non-1P device monitoring circuitry is further configured to extract a solution to the second failure that has occurred in the non-IP device by performing a detection for the extracted root cause of the second failure.

10. The network monitoring system according to claim 1, further comprising:
system failure automatic detection circuitry configured to constantly detect system failures in the IP network; and
designated-failure detection circuitry configured to designate an operation of a specific IP device in the IP network to detect a particular failure.

11. The network monitoring system according to claim 10, wherein the system failure automatic detection circuitry is further configured to detect at least one of a failure related to a connection port in the IP network, a failure related to a network cable, a failure related to an IP switch in the IP network, a failure related to duplicate IP addresses, a failure related to bandwidth, and a failure related to unknown traffic.

12. The network monitoring system according to claim 10, wherein the system failure automatic detection circuitry or the designated-failure detection circuitry is further configured to add a flow for monitoring when there is a flow that cannot be monitored in the IP network.

13. The network monitoring system according to claim 12, wherein the designated-failure detection circuitry is further configured to designate the operation by designating from a UI of a failure analysis function, notifying with an API call from a system controller, or identifying by performing analysis using the failure analysis function, and collate whether or not the designated operation is performed with the IP device and the IP network, to detect the particular failure.

14. The network monitoring system according to claim 13, wherein the detection of the particular failure based on the designated operation is performed by the IP network monitoring circuitry and the non-IP device monitoring circuitry.

15. The network monitoring system according to claim 11, wherein the system failure automatic detection circuitry is further configured to constantly monitor an ARP and an ARP reply, and hold a list of IP addresses/MACS in use, and the system failure automatic detection circuitry is further configured to detect, when an IP address in use is in use for another device, a failure related to the duplicate IP addresses.

16. A network monitoring method, comprising:
monitoring, by IP network monitoring circuitry, an IP network to which a plurality of IP devices is connected, the plurality of IP devices in the IP network being configured to communicate via the IP protocol, wherein the monitoring by the IP network monitoring circuitry further comprises extracting a first failure that has occurred in the IP network according to a first pre-classified primary isolation cause, and extracting a root cause of the first failure based on the first primary isolation cause; and monitoring, by non-IP network monitoring circuitry, a non-IP device using particular data of the non-IP device received via the IP network and the IP network monitoring circuitry, wherein the non-IP device is not configured to communicate via the IP protocol with any IP device connected to the IP network, and the monitoring by the non-IP device monitoring circuitry further comprises extracting, using the received particular data of the non-IP device, a second failure that has occurred in the non-IP device according to a second pre-classified primary isolation cause, and extracting a root cause of the second failure based on the second primary isolation cause.

17. A network monitoring method for a transmission system in which AV signals are converted into IP packets, the network monitoring method comprising:

monitoring, by IP network monitoring circuitry, an IP network to which a plurality of IP devices is connected, the plurality of IP devices in the IP network being configured to communicate via the IP protocol wherein the monitoring by the IP network monitoring circuitry further comprises extracting a first failure that has occurred in the IP network according to a first pre-classified primary isolation cause, and extracting a root cause of the first failure based on the first primary isolation cause; and monitoring, by non-IP network monitoring circuitry, a non-IP device using particular data of the non-IP device received via the IP network and the IP network monitoring circuitry, wherein the non-IP device is not configured to communicate via the IP protocol with any IP device connected to the IP network, the non-IP device being an AV device generating the AV signals, and the monitoring by the non-IP device monitoring circuitry further comprises extracting, using the received particular data of the non-IP device, a second failure that has occurred in the non-IP device according to a second pre-classified primary isolation cause, and extracting a root cause of the second failure based on the second primary isolation cause.

18. A non-transitory computer-readable medium storing a program, which when executed by processing circuitry, causes the processing circuitry to perform:

monitoring an IP network to which a plurality of IP devices is connected, the plurality of IP devices in the IP network being configured to communicate via the IP protocol, wherein the monitoring, by the IP network monitoring circuitry further comprises extracting a first failure that has occurred in the IP network according to a first pre-classified primary isolation cause and extracting a root cause of the first failure based on the first primary isolation cause; and monitoring a non-IP device using particular data of the non-IP device received via the IP network and the IP network monitoring circuitry, wherein the non-IP device is not configured to communicate via the IP protocol with any IP device connected to the IP network, and the monitoring by the non-IP device monitoring circuitry further comprises extracting monitoring by, using the received particular data of the non-IP device, a second failure that has occurred in the non-IP device according to a second pre-classified primary isolation cause, and extracting a root cause of the second failure based on the second primary isolation cause.

* * * * *